(12) United States Patent
Mogi et al.

(10) Patent No.: US 7,887,175 B2
(45) Date of Patent: Feb. 15, 2011

(54) ACTINIC RADIATION CURABLE INK, IMAGE FORMING METHOD AND INK-JET RECORDER, UTILIZING THE SAME

(76) Inventors: Kentarou Mogi, c/o Konica Minolta Medical & Graphic, Inc., 2970 Ishikawa-machi, Hachioji-shi, Tokyo (JP) 192-8505; Toshiyuki Takabayashi, c/o Konica Minolta Medical & Graphic, Inc., 2970 Ishikawa-machi, Hachioji-shi, Tokyo (JP) 192-8505

( * ) Notice: Subject to any disclaimer, the term of this patent is extended or adjusted under 35 U.S.C. 154(b) by 562 days.

(21) Appl. No.: 11/778,866

(22) Filed: Jul. 17, 2007

(65) Prior Publication Data
US 2008/0018725 A1     Jan. 24, 2008

(30) Foreign Application Priority Data
Jul. 20, 2006   (JP)   .............................. 2006-197838

(51) Int. Cl.
B41J 2/01   (2006.01)
(52) U.S. Cl. ...................... 347/102; 347/100; 523/160; 106/31.6; 106/31.13
(58) Field of Classification Search ................. 347/100, 347/102, 103; 106/31.13, 31.27, 31.6; 523/160
See application file for complete search history.

(56) References Cited

U.S. PATENT DOCUMENTS

| | | | |
|---|---|---|---|
| 4,288,479 A | | 9/1981 | Brack |
| 5,587,405 A | * | 12/1996 | Tanaka et al. ................. 522/98 |
| 6,162,863 A | * | 12/2000 | Ramalingam ................ 524/591 |
| 2002/0086914 A1 | | 7/2002 | Lee |
| 2004/0024091 A1 | * | 2/2004 | Yamada et al. .............. 523/160 |
| 2004/0048946 A1 | | 3/2004 | Tortorello |
| 2004/0167252 A1 | * | 8/2004 | Melchiors et al. ............. 524/13 |
| 2005/0190252 A1 | * | 9/2005 | Nishizeki et al. ............ 347/105 |
| 2010/0015336 A1 | * | 1/2010 | Takabayashi ................ 427/256 |

FOREIGN PATENT DOCUMENTS

| | | | |
|---|---|---|---|
| EP | 1502935 | | 2/2005 |
| JP | 05271318 A | * | 10/1993 |
| JP | 06200204 | | 7/1994 |
| JP | 08003493 | | 1/1996 |
| JP | 2001220526 | | 8/2001 |
| JP | 2002188025 | | 7/2002 |
| JP | 2002317139 | | 10/2002 |
| JP | 2003055449 | | 2/2003 |
| JP | 200459857 | | 2/2004 |
| JP | 2004124077 | | 4/2004 |
| JP | 2004277483 | | 10/2004 |
| JP | 2004351761 | | 12/2004 |
| JP | 2006298951 | | 11/2006 |
| WO | 9731071 | | 8/1997 |

* cited by examiner

Primary Examiner—Matthew Luu
Assistant Examiner—Rut Patel
(74) Attorney, Agent, or Firm—Lucas & Mercanti, LLP

(57) ABSTRACT

An actinic radiation curable ink comprising: a photopolymerizable compound; and a urethane polymer, wherein a content of isocyanate groups remaining in the urethane polymer is 0.1% or less based on the total number of the isocyanate groups required to prepare urethane polymer in the actinic radiation curable ink.

16 Claims, 2 Drawing Sheets

ACTINIC RADIATION CURABLE INK, IMAGE FORMING METHOD AND INK-JET RECORDER, UTILIZING THE SAME

This application is based on Japanese Patent Application No. 2006-197838 filed on Jul. 20, 2006 in Japan Patent Office, the entire content of which is hereby incorporated by reference.

TECHNICAL FIELD

The present invention relates to an actinic radiation curable ink, an image forming method and an ink-jet recorder, which utilize the same. In more detail, the invention relates to an actinic radiation curable ink which can form cured film having flexibility and superior adhesion with a recording material (medium) without loosing sensation in quality of a printed matter, and an image forming method and an ink-jet recorder which utilize said ink.

BACKGROUND

Heretofore, an actinic radiation curable composition, which cures by actinic energy rays such as ultraviolet rays and electron rays, is utilized in practice for various applications such as paint, adhesives and printing ink on such as plastics, paper, woodwork and inorganic materials; a printed circuit board and electric insulation related matters. In recent years, as for actinic radiation curable ink among them, furthermore improvement of adhesion on a recording material (medium) and improvement of flexibility of cured film after curing have been desired.

Particularly, in the case of forming an image on a fiber material (medium) such as cloth by use of actinic radiation curable ink, there caused serious problems that sensation in quality of the cloth may be spoiled due to insufficient flexibility of cured film and that cured film may be peeled off when the cloth is crumpled after image formation.

On the other hand, as an ink system for ink-jet ink utilizing a polymerizing composition, there is known ultraviolet curable ink-jet ink, and this ink-jet method utilizing ultraviolet curable ink, which has been disclosed (for example refer to patent literatures 1 and 2), is attracting attention in recent years with respect to rapid drying and recording capability on a recording medium without an ink absorptive property.

However, there was a problem that cured film is broken because the formed cured film cannot follow a recording material due to lack of flexibility, resulting in printing being possible only on limited recording materials (thick ones). It has been disclosed to provide ink-jet ink with plasticity by addition of a plasticizer (for example, refer to patent literature 3). However, this is for melt type ink and there is no description with respect to ultraviolet curable ink utilizing solvent type ink.

Further, in the case of utilizing ultraviolet curable ink, there is a problem that ejection is unstable depending on working environment and particularly it becomes more severe in the case of adding a flexibility improving agent such as a plasticizer as described before.

Further, there is a problem that ink utilizing a cationic polymerizing compound is easily affected by water content (moisture) of a molecular level (for example, refer to patent literatures 4-7).

[Patent literature 1] JP-A 6-200204 (hereinafter, JP-A refers to Japanese Patent Publication Open to Public Inspection No.)

[Patent literature 2] Japanese Translation of PCT International Application Publication No. 2000-504778 (97/31071)
[Patent literature 3] JP-A 8-3493
[Patent literature 4] JP-A 2001-220526
[Patent literature 5] JP-A 2002-188025
[Patent literature 6] JP-A 2002-317139
[Patent literature 7] JP-A 2003-55449

SUMMARY

This invention has been made in view of the above-described problems; the object is to provide actinic radiation curable ink which can form cured film having excellent color mixing resistance, hardness, peel-off resistance and flexibility, and an image forming method and ink-jet recorder, utilizing said ink.

The above-described problems can be solved by the following embodiments.

(1) An embodiment of the present invention is an actinic radiation curable ink comprising:
 a photopolymerizable compound; and
 a urethane polymer,
 wherein a content of isocyanate groups remaining in the urethane polymer is 0.1% or less based on the total number of the isocyanate groups required to prepare the urethane polymer in the actinic radiation curable ink.

(2) Another embodiment of the present invention is an actinic radiation curable ink,
 wherein the urethane polymer has no photopolymerizable groups in the molecule.

(3) Another embodiment of the present invention is an actinic radiation curable ink,
 wherein the urethane polymer has a weight average molecular weight of 600 to 10,000.

(4) Another embodiment of the present invention is an actinic radiation curable ink,
 wherein a content of the urethane polymer is 1 to 20 weight % based on the total weight of the actinic radiation curable ink.

(5) Another embodiment of the present invention is an actinic radiation curable ink,
 wherein the photopolymerizable compound comprises a mono-functional monomer in an amount of 10 to 30 weight % based on the total weight of the photopolymerizable compound.

(6) Another embodiment of the present invention is an actinic radiation curable ink,
 wherein the photopolymerizable compound comprises a mono-functional epoxy monomer or a bi-functional epoxy monomer.

(7) Another embodiment of the present invention is an actinic radiation curable ink,
 wherein the photopolymerizable compound comprises a mono-functional oxetane monomer or a bi-functional oxetane monomer.

(8) Another embodiment of the present invention is an actinic radiation curable ink, further comprising a pigment as a colorant.

(9) Another embodiment of the present invention is a method of forming an image comprising the steps of:
 ejecting droplets of the actinic radiation curable ink from an ink-jet recording head so as to deposit on a recording material; and
 irradiating the deposited droplets of the ink on the recording material with actinic radiations,
 wherein the recording material is made of a fiber material.

(10) Another embodiment of the present invention is a method of forming an image comprising the steps of:

ejecting droplets of the actinic radiation curable ink from an ink-jet recording head so as to deposit on a recording material; and irradiating the deposited droplets of the ink on the recording material with actinic radiations, wherein both the actinic radiation curable ink and the ink-jet recording head have been heated in the range of 35 to 100° C. prior to ejecting the actinic radiation curable ink from the ink-jet recording head.

DESCRIPTION OF THE PREFERRED EMBODIMENT

Figure 1:
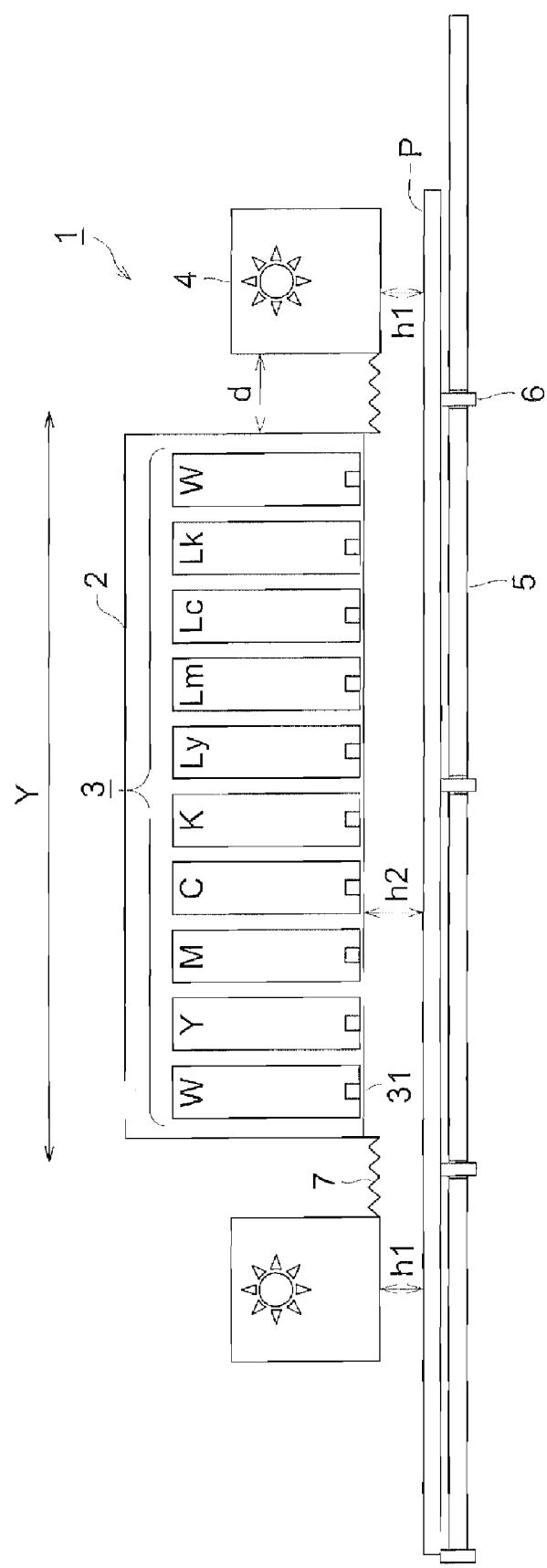
FIG. 1 is a front view to show a constitution of the primary portion of an ink-jet recorder of this invention.

An actinic radiation curable ink of this invention is an actinic radiation curable ink containing a photopolymerizable compound and contains a urethane polymer, wherein the isocyanate group number remaining among said urethane polymer is 0.1% or less against the total isocyanate group number of an isocyanate compound required for synthesis of said urethane polymer.

Heretofore, it is well known that urethane polymer, which is available on the market, having a high molecular weight over 10,000 based on a weight average molecular weight is utilized for paint and printing ink, however, urethane polymer in which a radical polymerizing group or a cationic polymerizing group is introduced (modification) has been utilized.

The inventors of this invention have found that the aforesaid problems can be rapidly solved by employing urethane polymer, wherein the isocyanate group number remaining among actinic radiation curable ink is 0.1% or less against the total isocyanate group number of an isocyanate compound required for synthesis of said urethane polymer, in actinic radiation curable ink. Herein, by employing those actinic radiation curable ink, in which a weight average molecular weight of said urethane polymer is 600-1000, problems of the aforesaid adhesion property and flexibility of cured film can be solved without disturbing reactivity of a polymerizing compound.

As a technology to solve a problem of flexibility of cured film, it is preferable to utilize a large amount as much as 10-30 weight % of mono-functional monomer as a photopolymerizable compound, however, simply it alone is not sufficient and there was a problem of generation of wrinkles at the time of ink curing due to deterioration of curing ability. It has been found that this wrinkle problem can be solved by employing urethane polymer having reactive groups in a molecule of equal to 0.1% or less.

Particularly, in the case of utilizing at least one type of epoxy monomer of mono-functional or bifunctional as a photopolymerizable compound, it is preferable because a problem of curing wrinkles easily caused under low humidity can be remarkably improved. Further, it has been found that the improvement effect is large in the case of incorporation of oxetane monomer, and ejection stability at the time of ink-jet recording is improved resulting in formation of an image having a high precision with very good reproducibility.

In the following, this invention and constituent elements thereof will be detailed.

(Urethane Polymer)

Actinic radiation curable ink of this invention is actinic radiation curable ink containing a photopolymerizable compound and contains a urethane polymer, wherein the isocyanate group number remaining among said urethane polymer is 0.1% or less against the total isocyanate group number of an isocyanate compound required for synthesis of said urethane polymer. The urethane polymer of the present invention is a compound having a urethane bond in the molecule and includes a urethane oligomer.

Herein, "an isocyanate group" refers to a —N=C=O group. The quantitative analysis of an isocyanate group can be made by various methods and, for example, it can be determined by neutralization titration of 0.1 g of a reaction solution containing polymer, after having been added and dissolved in 40 ml of dimethylformamide solution of 0.01 normal di-n-butylamine, with a methanol solution of 0.01 normal hydrochloric acid utilizing Bromophenol Blue as an indicator.

Since an isocyanate group has very high reactivity, a reaction will proceed to form a urethane bond, when a compound provided with active hydrogen such as a hydroxide group is present. Therefore, when isocyanate residual group is over 0.1%, viscosity of ink will be significantly increased after storage resulting in a problem. Particularly, in the case of utilizing the ink as ink-jet ink, ejection capability from a recording head is deteriorated due to increase of viscosity of ink to make the ink unusable.

Further, urethane polymer according to this invention is preferably provided with no photo-polymerizing group. Herein, "a photo-polymerizing group" refers to a radial polymerizing group such as an acryloyl group and a vinyl group, which is provided polymerizing monomer, represented by such as acrylate and vinyl ether; and a cationic polymerizing group represented by such as an oxirane group and an oxetane group.

When a photo-polymerizing group is contained in urethane polymer according to this invention, there caused a problem of such as increase of ink viscosity and deterioration of curing ability, after storage.

The content thereof in actinic radiation curable composition is preferably 1-20 weight % and more preferably 5-15 weight %. There is no effect in the case of less than 1 weight %, while abrasion resistance of cured film is deteriorated and curing ability is also deteriorated in the case of over 20 weight % to make the composition unusable.

A weight average molecular weight of urethane polymer and/or oligomer is preferably 600-10,000. By setting this range, a problem of the aforesaid adhesion property and flexibility of cured film can be improved without disturbing reactivity of a photopolymerizable compound.

Herein, a weight average molecular weight is a value measured by a GPC (Gel Permeation Chromatography) method. When the weight average molecular weight is less than 600, the addition effect is insufficient, while, when the weight average molecular weight is over 10,000, it is not preferable that reactivity of a photopolymerizable compound will be spoiled. It is more preferable to utilize urethane polymer or oligomer having a weight average molecular weight of 1,000-4,000, and this range is specifically preferable in the case of utilizing the polymer or oligomer in actinic radiation curable ink-jet ink.

As a manufacturing method of urethane polymer and oligomer, technologies of an urethanation reaction well known in the urethane polymer industry can be employed. For example, there is such as a prepolymer method in which high molecular weight polyol and organic diisocyanate are reacted at ordinary temperature—200° C. to synthesis urethane prepolymer having a NCO terminal, which is added with a chain elongating agent and further polymerized at ordinary temperature—250° C. to prepare an aimed thermoplastic polyurethane; a one-shot method in which high molecular weight polyol, organic diisocyanate and a chain elongating agent are added together to be reacted at ordinary temperature—250° C., whereby an aimed thermoplastic polyurethane is prepared; and a solid phase polymerization method in which the aforesaid terminal NCO urethane polymer and a chain elongating agent are reacted at ordinary temperature—150° C. and the generated polymer, after having been ground, was polymerized at ordinary temperature—150° C.; however this invention is not limited thereto. As a chain elongating agent of a urethane polymer according to this invention, utilized can be aliphatic diamines such as ethylene diamine, propylene diamine and hexamethylene diamine; alicyclic diamines such as isophorone diamine and 4,4'-dicyclohexylmethane diamine; aromatic diamines such as tolylene diamine; aromatic aliphatic diamine such as xylylene diamine; diamines having a hydroxyl group such as N-(2-hydroxyethyl)ethylene diamine, N-(2-hydroxyethyl)propylene diamine and N,N'-di (2-hydroxyethyl)ethylene diamine; and hydrazine.

Further, in manufacturing of a urethane polymer according to this invention, appropriately utilized can be a reaction stopping agent, which includes monoalkylamines such as n-propylamine and n-butylamine; dialkylamines such as di-n-butylamine; alkanolamines such as monoethanolamine and diethanolamine; and monoalcohols such as ethanol.

Specifically, by utilizing an excess amount of diisocyanate such as tolylene diisocyanate, methylenediphenylene diisocyanate, m-xylylene diisocyanate, hexamethylene diisocyanate and isophorone diisocyanate; and polyol such as (poly) ethylene glycol, (poly)propylene glycol, 1,4-butanediol, 1,6-hexanediol, neopentyl glycol, trimethylol propane, glycerin, pentaerythritol and dipentaerythritol; and performing a reaction at 180° C. while controlling the reaction time, whereby urethane polymer and/or oligomer can be prepared, however, this invention is not limited thereto.

(Photopolymerizable Compound)

Further, in this invention, it is preferable to further utilize 10-30 weight % of mono-functional monomer as a photopolymerizable compound in combination. Mono-functional monomer provides insufficient effect at less than 10 weight %, while provides a problem of image quality due to significant deterioration of curing ability to cause color bleeding at over 30 weight %. Specific examples of mono-functional monomer include the following, however, are not limited thereto.

As a polymerizing compound utilized in an actinic radiation curable composition of this invention, a compound having an oxirane group is preferable with respect to small shrinkage at the time of curing. As a compound having an oxirane group, all mono-functional or bi-functional epoxy monomer well known in the art in addition to the aforesaid mono-functional epoxy monomer can be utilized.

Specifically, listed are an aromatic epoxy compound, an alicyclic epoxy compound and an aliphatic epoxy compound, which are conventionally well known in the art. Herein, hereinafter, epoxy compound means monomer or oligomer thereof. As oligomer in this invention, a compound having a low molecular weight is preferable and more preferable is oligomer having a molecular weight of less than 1,000.

An aromatic epoxy compound is preferably di- or polyglycidyl ether manufactured by a reaction of polyhydric phenol or an alkylene oxide adduct thereof with epichlorohydrin, and includes such as polyglycidyl ether of bisphenol A or an alkylene oxide adduct thereof, polyglycidyl ether of hydrogenated bisphenol A or an alkylene oxide adduct thereof and novolac type epoxy resin. Herein, alkylene oxide includes such as ethylene oxide and propylene oxide.

An alicyclic epoxy compound is preferably a compound containing cyclohexene oxide or cyclopentene oxide which is prepared by epoxidation of a compound having at least one cycloalkane ring such as a cyclohexene or cyclopentene ring by use of such as hydrogen peroxide and peracid, and includes such as the following compounds.

An aliphatic epoxy compound is preferably di- or polyglycidyl ether of aliphatic polyhydric alcohol or an alkylene adduct thereof, and typical examples include diglycidyl ether of alkylene oxide such as diglycidyl ether of ethylene glycol, diglycidyl ether of propylene glycol or diglycidyl ether of 1,6-hexanediol; polyglycidyl ether of polyhydric alcohol such as di- or tri-glycidyl ether of glycerin or alkylene oxide adduct thereof; and diglycidyl ether of polyalkylene glycol such as diglycidyl ether of polyethylene glycol or an alkylene oxide adduct thereof and diglycidyl ether of polypropylene glycol or an alkylene oxide adduct thereof. Herein, alkylene oxide includes ethylene oxide and propylene oxide.

Further, in addition to these compounds, such as monoglycidyl ether of aliphatic higher alcohol and monoglycidyl ether of cresol, which are monomer having one oxirane ring in a molecule, can be also utilized. Among these epoxy compounds, an aromatic epoxy compound and an alicyclic epoxy compound are preferable and an alicyclic epoxy compound is specifically preferable, in consideration of rapid curing ability. Specific examples of a bi-functional epoxy compound include Celloxide 2021P and Celloxide 3000; however, this invention is not limited thereto.

As a polymerizing compound utilized in an actinic radiation curable composition of this invention, a compound having an oxetane ring is preferably further incorporated with respect to improvement of ejection stability. Cationic polymerizing mono-functional monomer includes oxetane compounds OXT211, OXT212, OXT101 and OXT213, manufactured by Tea Gosei Co., Ltd.; and epoxy compounds AOEX24 and AOEX68, manufactured by Daicel Chemical Industries Ltd. Further utilizable oxetane compounds include any oxetane compound well known in the art such as those disclosed in JP-A Nos. 2001-220526 and 2001-310937 in addition to the above-described mono-functional oxetane compounds. Specific examples of a bi-functional oxetane compound include such as DOX, HQOX and RSOX, however, this invention is not limited thereto.

Further, in this invention, any vinyl ether compound well known in the art can be utilized in combination as a polymerizing compound.

Other polymerizing compounds include any radical polymerizing compound well known in the art. For example, listed in addition to the above-described mono-functional radical monomer are a bi-functional monomer such as 1,4-butanediol diacrylate, 1,6-hexanediol diacrylate, 1,9-nonanediol diacrylate, neopentylglycol diacrylate, dimethyloltricyclodecane diacrylate, EO adduct of bisphenol diacrylate, PO adduct of bisphenol diacrylate, hydroxypivalic acid neopentylglycol diacrylate and polytetramethyleneglycol diacrylate; and a poly-functional not less than tri-functional monomer such as trimethylolpropane triacrylate, EO modified trimethylolpropane triacrylate, pentaerythritol triacrylate, pentaerythritol tetraacrylate, dipentaerythritol hexaacrylate, ditrimethylolpropane tetraacrylate, glycerin-propoxy triacrylate, caprolactone modified trimethylolpropane triacrylate, pentaerythritolethoxy tetraacrylate and caprolactone modified dipentaerythritol hexaacrylate.

In addition to these, polymerizing oligomers are also blended similar to monomer. Polymerizing oligomer includes such as epoxy acrylate, aliphatic urethane acrylate, aromatic urethane acrylate, polyester acrylate and straight chain acryl oligomer.

The actinic radiation curable ink of the present invention preferably incorporates a photo-initiator which enable to start polymerization by irradiation with light. Photo-initiators (photo-acid generating agents and photo-radical generating agents) well known in the art which are described in such as "Application and Market of UV-EB Curing Technologies" (C. M. C Shyuppan, supervised by Yoneho Tabata/edited by Radotech Study Group) can be utilized.

As a photo-induced acid generator, for example, a compound utilized in chemical amplification type photoresist and photo-induced cationic polymerization (refer to p. 187-192 of "Organic Materials for Imaging", edited by Organic Electronics Material Study Group, Bunshin Shuppan (1993)) is employed. Preferable compound suitable in this invention will be listed below:

Aryl sulfonium salt derivatives (e.g., Silacure UVI-6990, Silacure UVI-6974 by Union Carbide CO. Ltd., Adeca Optoma SP-150, Adeca Optoma SP-152, Adeca Optoma SP-170, and Adeca Optoma SP-172 by Asahidenka CO. Ltd.); aryl iodonium salt derivatives (e.g., RP-2074 by Rhodia Co. Ltd.); arene-ion complex derivatives (e.g., Irgacure 261 by Ciba Geigy CO. Ltd.); diazonium salt derivatives; triazine type initiator and other halide compounds.

(Photo-Induced Radical Generator)

As a photo-induced radical generator, initiators well known in the art such as arylalkyl ketone, oxime ketone, thiobenzoic acid S-phenyl, titanocene, aromatic ketone, thioxanthone, derivatives of benzyl and quinine, and ketocumarines can be utilized. Among them, acylphosphineoxide and acylphosphonato are specifically effective to interior curing in curable composition having a considerable thickness due to a high sensitivity and decrease of absorption by photocleavage of an initiator. Specifically, such as bis(2,4,6-trimethylbenzoyl)-phenylphosphinoxide and bis(2,6-dimethoxybenzoyl)-2,4,4-trimethyl-pentylphosphineoxide are preferable.

Further, as those selected in consideration of safety similar to the aforesaid monomer, 1-hydroxy-cyclohexyl-phenyl-ketone, 2-methyl-1[4-(methylthio)phenyl]-2-morpholinopropane-1-one, bis(2,6-dimethoxybenzoyl)-2,4,4-trimethyl-pentylphosphineoxide and 2-hydroxy-2-methyl-1-phenylpropane-1-one (Dalocure (registered trade mark) 1173) are preferably utilized.

The addition amount of a photo-initiator is preferably 1-6 weight % and more preferably 2-5 weight %, against the total ink.

Actinic radiation curable ink of this invention contains various types of dye and/or pigment well known in the art, and preferably contains pigment which is excellent in weatherproofing.

Pigment preferably utilized in this invention will be listed below.

C. I. Pigment Yellow-1, 2, 3, 12, 13, 14, 16, 17, 73, 74, 75, 81, 83, 87, 93, 95, 97, 98, 109, 114, 120, 128, 129, 138, 150, 151, 154, 180, 185;

C. I. Pigment Red-5, 7, 12, 22, 38, 48:1, 48:2, 48:4, 49:1, 53:1, 57:1, 63:1, 101, 112, 122, 123, 144, 146, 168, 184, 185, 202;

C. I. Pigment Violet-19, 23;

C. I. Pigment Blue-1, 2, 3, 15:1, 15:2, 15:3, 15:4, 18, 22, 27, 29, 60;

C. I. Pigment Green-7, 36;

C. I. Pigment White-6, 18, 21;

C. I. Pigment Black-7.

Further, in this invention, white ink is preferably utilized in order to increase a color shielding effect with a transparent substrate such as plastic film. White ink is specifically preferably utilized in soft package printing and label printing.

For dispersion of the above-described pigment, such as a ball mill, a sand mill, an attritor, a roll mill, an agitator, a Henschel mixer, a colloidal mill, an ultrasonic homogenizer, a pearl mill, a wet jet mill and a paint shaker can be utilized. Further, a dispersant may be also added at the time of dispersion of pigment. As a dispersant, preferably utilized is a polymer dispersant which includes Solsperse series by Avecia Corp. and PB series by Ajinomoto Finetechno Corp. Further, a synergist corresponding to various types of pigment as a dispersion aid can be also utilized. These dispersant and dispersion aid are preferably added at 1-50 weight parts against 100 weight parts of pigment. A solvent or a photopolymerizable compound is utilized as a dispersion medium, however, as for actinic radiation curable ink utilized in this invention, solvent-less is preferred since reaction and curing are performed immediately after ink landing. When a solvent remains in a cured image, there caused a problem of deterioration of solvent resistance and a VOC problem of a residual solvent. Therefore, a dispersion medium is preferably not a solvent but a photopolymerizable compound, and monomer having the lowest viscosity among them is more preferably selected with respect to dispersion adaptability.

For dispersion of pigment, it is preferable to make the particle size of pigment particles of 0.08-0.5 μm, and selection of pigment, a dispersant and a dispersion medium; dispersion condition, and filtration condition are appropriately set so as to make the maximum particle size of 0.3-10 μm and preferably of 0.3-3 μm. By this particle size control, clogging of a head nozzle is depressed and storage stability, transparency and curing sensitivity of ink can be maintained.

In ink-jet ink of this invention, pigment concentration is preferably 1-10 weigh % against the whole ink.

(Recording Material)

As a recording material utilized in this invention, various types of non-absorptive plastic and film thereof, which are employed in so-called soft packaging, in addition to ordinary non-coated paper and coated paper can be utilized, and various plastic film includes such as PET film, OPS film, OPP film, ONy film, PVC film, PE film and TAC film. In addition to these, such as polycarbonate, acrylic resin, ABS, polyacetal, PVA and rubbers can be utilized. Further, metals and glasses are also applicable. Actinic radiation curable ink of this invention is characterized by being specifically suitable as ink in the case of forming an image on a fiber material (medium) such as cloth. A fiber material is not specifically limited and various types of materials can be utilized, however, synthetic fiber is preferable. Synthetic fiber according to this invention includes those generally available on the market such as polyester fiber, polyamide fiber, polyvinyl alcohol fiber, polyethylene fiber, polypropylene fiber and polyaramide fiber. Clothes made of synthetic fiber include such as cloth, knit and non-woven cloth. Tarpaulin is cloth the surface of which is covered with polyvinyl chloride resin and may be manufactured by any method of a laminating method, a coating method, a patting method and a topping method or a combined method thereof. As vinyl chloride resin, either of a paste resin type and a straight resin type can be utilized. In vinyl chloride resin, blended can be a plasticizer, filler, an anti-freezing agent, a non-flammable agent and an ultraviolet absorbent which are generally blended.

Herein, actinic radiation curable ink of this invention is specifically suitable for image formation on a polyester fiber material among the above described synthetic fiber and can form an image without disturbing sensation in quality of a recording material and having no peel-off of cured film.

Utilizing methods corresponding to applications will be described below.

In the case of printing ink application, an actinic radiation curable ink can be utilized in various types of printing methods such as planographic printing such as off set printing, letter press printing, silk screen printing or gravure printing employing such as paper, film or a sheet as a substrate. An actinic radiation curable composition is cured by irradiation of actinic radiations after printing. Actinic radiations include such as ultraviolet rays, X rays and electron rays. As a light source in the case of curing with ultraviolet rays, various types including such as an increased pressure or high pressure mercury lamp, a metal halide lamp, a xenon lamp, a non-electrode lamp or a carbon arc lamp can be utilized. In the case of curing with electron rays, utilized can be various types of irradiation devices which include such as Cockcroft-Walton's type, Van de Graaff's type or a resonance transformer type; electron rays preferably have energy of 50-1,000 eV and more preferably of 100-300 eV. In this invention, it is preferable to utilize ultraviolet rays for curing of an actinic radiation curable ink with respect to capability of using low cost equipment.

(Image Forming Method)

Next, an ink-jet image forming method of this invention will be explained.

In an image forming method of this invention, preferable is a method in which the above-described ink is ejected and drawn on a recording medium by an ink-jet recording material and successively the ink is cured by irradiation of actinic radiations such as ultraviolet rays.

<Total Ink Layer Thickness after Ink Landing>

In this invention, the total ink layer thickness, after ink has landed on a recording material and has been cured by irradiation of actinic radiations, is preferably 2-20 μm. In actinic radiation curable ink-jet recording of a screen printing field, it is the present state that the total ink layer thickness is over 20 μm, however, in a soft package printing field, wherein thin plastic material is often utilized as a recording material, ink ejection of an excess layer thickness is not preferable because of a problem of not only the aforesaid curl and/or wrinkle of a recording material but also change of stiffness and/or sensation in quality of the whole printed matter.

Herein, "the total ink layer thickness" means the maximum value of a layer thickness of ink drawn on a recording material, and the meaning of the total ink layer thickness is same in any ink-jet recording of monochrome, or of two colors accumulation, three colors accumulation and four colors accumulation (white ink base).

<Ink Ejection Condition>

In image formation utilizing ink of this invention, as an ink ejection condition, ejection is preferably performed while a recording head and ink are heated at 35-100° C. with respect to ejection stability. Since actinic radiation curable ink exhibits a large viscosity variation width due to temperature variation and the viscosity variation itself significantly influences a liquid drop size and a liquid drop ejection speed resulting in deterioration of image quality, it is necessary to increase ink temperature while keeping the ink temperature constant. The control range of ink temperature is preferably a set temperature ±5° C., preferably a set temperature ±2° C. and furthermore preferably a set temperature ±1° C.

<Light Irradiation Condition after Ink Landing>

In an image forming method of this invention, as an irradiation condition of actinic radiations, actinic radiations are irradiated preferable within 0.001-1.0 second after ink landing and more preferably within 0.001-0.5 seconds. To form an image having a high precision, it is specifically important that the irradiation timing is the faster.

As an irradiation method of actinic radiations, the basic method is disclosed in JP-A 60-132767. According to this, light sources are arranged on the both sides of a head unit and the head and light sources are scanned in a shuttle mode. Irradiation is performed leaving a predetermined time after ink landing. Further, curing is completed by another light source without drive. In U.S. Pat. No. 6,145,979, as an irradiation method, disclosed are a method to utilize an optical fiber and a method in which a collimated light source is incident in a mirror arranged on the side plane of a head unit and UV light is irradiated on the recoded portion. Any of these irradiation methods can be employed in an image forming method of this invention.

(Ink-Jet Recorder)

Next, an ink-jet recorder (hereinafter, simply referred to as a recorder) according to this invention will be explained.

In the following, a recorder according to this invention will be explained appropriately referring to the drawings. Herein, a recorder of the drawings is only an embodiment of a recorder of this invention and a recorder of this invention is not limited to the drawings.

FIG. 1 is a front view to show a constitution of the primary portion of a recorder according to this invention. Recorder 1 is constituted of such as head carriage 2, recording head 3, irradiation means 4 and platen portion 5. In this recorder 1, platen portion 5 is arranged under recording material P. Platen portion 5 has a function to absorb ultraviolet rays and absorbs excess ultraviolet rays having passed through recording material P. As a result, an image having a high precision can be reproduced very stably.

Recording material P is guided by guide member 6 and transferred from this side to the interior of FIG. 1 by operation of a transfer means (not shown in the drawing). A head scanning means (not shown in the drawing) performs scanning of recording head 3 held by head carriage 2 by shifting head carriage 2 back and forth along the Y direction of FIG. 1.

Head carriage 2 is arranged over recording material P and stores, plural number of recording head 3, which will be described later, corresponding to the number of colors utilized in image printing on recording material P, while placing the ejection outlet downward. Head carriage 2 is arranged in a state of being freely shiftable back and forth in Y direction in FIG. 1 against a recorder 1 main body, and is transferred back and forth along Y direction in FIG. 1 by drive of a head scanning means.

Herein, in FIG. 1, head carriage 2 is drawn so as to store recording head 3 of white (W), yellow (Y), magenta (M), cyan (C), black (K), light yellow (Ly), light magenta (Lm), light cyan (Lc), light black (Lk) and white (W), however, in practice, the color number of recording head 3 stored in head carriage 2 is appropriately determined.

Recording head 3 ejects actinic radiation curable ink (such as ultraviolet ray curable ink) supplied from an ink supply means (not shown in the drawing) toward recording material P from an ejection outlet by operation of an ejection means (not shown in the drawing), plural number of which are arranged in the interior. UV ink ejected from recording head 3 is comprised of such as a colorant, polymerizing monomer and an initiator, and is provided with ability of being cured by a cross-linking and polymerization reaction accompanied with catalytic action of an initiator with irradiation of ultraviolet rays.

Recording head 3 ejects UV ink as ink drops against a predetermined region of recording material P during scanning to be shifted from one end of recording material P to the other end of recording material P along Y direction in FIG. 1 by drive of a head scanning means, whereby ink drops are landed on said region capable of being landed.

After the above-described scan is performed appropriate times to eject UV ink toward one of a region capable of being landed, recording material P is shifted from this side to the interior direction of FIG. 1 by a transfer means and UV ink is ejected toward the next region capable of being landed adjacent along the interior direction of FIG. 1 against the above-described region capable of being landed by recording head 3 while again performing a scan by a head scanning means.

By repeating the above-described operations to eject UV ink from recording head 3 synchronous with a head scanning means and a transfer means, an image comprising aggregate of UV ink drops is formed on recording material P.

Irradiation means 4 is constituted of an ultraviolet lamp, which emits ultraviolet rays of a specific wavelength region at stable exposure energy, and a filter, which transmits ultraviolet rays of a specific wavelength region. Herein, as an ultraviolet lamp, such as a mercury lamp, a metal halide lamp, an excimer laser, an ultraviolet laser, a cold cathode tube, a black light and a LED (Light Emitting Diode) are applicable.

Irradiation means 4 is provided with a form approximately same as the maximum one of the region which can be set by recorder (UV ink jet printer) 1, among a region capable of being landed by UV ink ejected from recording head 3 in one time scan by drive of a head scanning means, or larger than a region capable of being landed.

Irradiation means 4 is arranged by being fixed in nearly parallel to recording material P on the both sides of head carriage 2.

As described before, as a means to adjust illuminance at an ink ejection portion, the whole of recording head 3 is naturally light shielded; in addition to this, it is effective to set distance h2 between ink ejection portion 31 of recording head 3 and recording material P larger than distance h1 between irradiation means 4 and recording material P (h1<h2), or to make distance d between recording head and irradiation means 4 remote (make d large). Further, it is more preferable to provide bellows structure 7 between recording head 3 and irradiation means 4.

Herein, the wavelength of ultraviolet rays irradiated by irradiation means 4 can be appropriately varied by changing an ultraviolet lamp or a filter which is arranged in irradiation means 4.

Ink of this invention is excellent in ejection stability and is specifically effective in the case of image formation by use of a line head type recorder.

Figure 2:
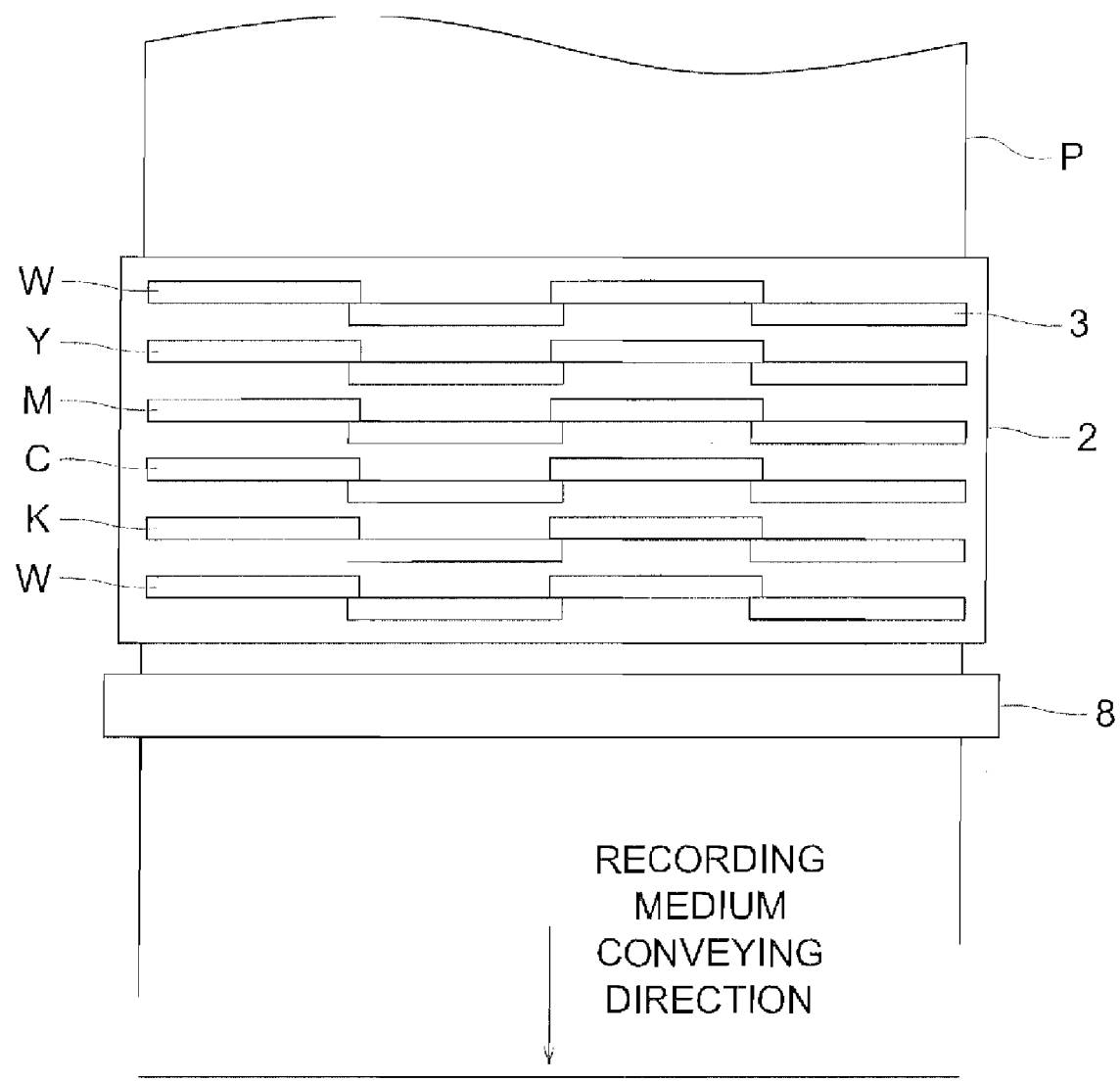
FIG. 2 is an over view to show an example of a constitution of the primary portion of an ink-jet recorder of a line head type.

FIG. 2 is an over view to show another example of a constitution of the primary portion of an ink-jet recorder.

An ink-jet recorder shown in FIG. 2 is called as a line head type, and plural sets of recording head 3 of each color are fixing arranged in head carriage 2 so as to cover the whole width of recording material P.

On the other hand, in downstream of head carriage 2, irradiation means 8 is arranged similarly so as to cover the whole width of recording material P.

In this line head type, head carriage 2 and irradiation means 8 are fixed, and only recording material P is transferred to form an image by performing ink ejection and curing.

Herein, actinic radiation curable ink of this invention is ejected preferably after actinic radiation curable ink and a recording head have been heated at 35-100° C., with respect to solving problems according to this invention.

EXAMPLE

In the following, this invention will be specifically explained referring to examples, however, an embodiment of this invention is not limited to these examples.

<Synthesis of Polyurethane (Urethane Polymer)>

In this invention, an excess amount of 1,4-butanediol and diphenylmethane diisocyanate were mixed and reacted with stirring at 180° C. Next, the resulting system was added with ethylenediamine as a chain elongating agent and further stirred. N-propylamine as a reaction stopping agent was added and the reaction time was controlled to make weight average molecular weights and the content of isocyanate groups are as indicated for exemplary compounds A-D, whereby the following exemplary compounds A-D were synthesized. The figure after the name of compound indicates a weight average molecular weight. The figure in the parentheses indicates the content of remaining isocyanate groups in the compound.

Exemplary Compound A: 2,000 (0.01%)
Exemplary Compound B: 3,500 (0.01%)
Exemplary Compound B': 3,500 (0.1%)
Exemplary Compound B": 3,500 (0.2%)
Exemplary Compound C: 8,000 (0.03%)
Exemplary Compound D: 15,000 (0.03%)

Further, similarly, ethylene glycol and an excess amount of hexamethylene diisocyanate were employed; n-propylamine was added as a reaction stopping agent; and the reaction time was controlled to make weight average molecular weights of the following exemplary compounds E - H, whereby the following exemplary compounds E - H were synthesized. The figure in the parentheses indicates the content of remaining isocyanate groups in the compound.

Exemplary Compound E: 1,500 (0.05%)
Exemplary Compound F: 3,000 (0.05%)
Exemplary Compound G: 9,000 (0.06%)
Exemplary Compound H: 13,000 (0.06%)

(Evaluation of Ink-jet Output Image)

<Preparation of Dispersion>

Pigment was dispersed according to the following compositions.

[Cationic Polymerization System]

The following two types of compounds were charged in a stainless beaker, and were dissolved with stirring for 1 hour while being heated on a hot plate of 65° C.

| | |
|---|---|
| PB 822 (dispersant, manufactured by Ajinomoto Finetechno Co., Ltd.) | 9 parts |
| OXT-221 (manufactured by Toa Gosei Co., Ltd.) | 71 parts |

The system, after having been cooled down to room temperature, was added with 20 parts of the following pigment and sealed in a glass bottle together with 200 g of zirconia beads having a 0.5 m diameter. The resulting system was subjected to dispersion treatment for the following time by use of a paint shaker, and then the zirconia beads were removed.

| | |
|---|---|
| Pigment 1: Pigment Black 7 (#52, manufactured by Mitsubishi Chemical Co., Ltd.) | 10 hours |
| Pigment 2: Pigment Blue 15:4 (Blue No. 32, manufactured by Dainichiseika Color & Chemicals Mfg. Co., Ltd.) | 9 hours |
| Pigment 3: Pigment Yellow 150 (E4GN-GT CH20015, manufactured by Lanxess Corp.) | 8 hours |
| Pigment 4: Pigment Red 122 (CFR-321, manufactured by DainichiSeika Color & Chemicals Mfg. Co., Ltd.) | 10 hours |
| Pigment 5: Titanium oxide (anatase type: particle size of 0.2 μm) | 10 hours |

[Radical Polymerization System]

The following two types of compounds were charged in a stainless beaker and dissolved with stirring for 1 hour while being heated on a hot plate of 65° C.

| | |
|---|---|
| Solsperse 32000 (dispersant manufactured by Avecia K.K.) | 9 parts |
| Tetraethyleneglycol diacrylate (bi-functional) | 71 parts |

The system, after having been cooled down to room temperature, was added with 20 parts of the following pigment and sealed in a glass bottled together with 200 g of zirconia beads having a 0.5 mm diameter. The resulting system was subjected to dispersion treatment for the following time by use of a paint shaker, and then the zirconia beads were removed.

| | |
|---|---|
| Pigment 6: Pigment Black 7 (MA7, manufactured by Mitsubishi Chemical Co., Ltd.) | 8 hours |
| Pigment 7: Pigment Blue 15:4 (Cyanine Blue 404, manufactured by Sanyo Color Works, Ltd.) | 8 hours |
| Pigment 8: Pigment Yellow 180 (CFY-313-2, manufactured by DainichiSeika Color & Chemicals Mfg. Co., Ltd.) | 10 hours |
| Pigment 9: Pigment Violet 19 (CFR-338-3, manufactured by DainichiSeika Color & Chemicals Mfg. Co., Ltd.) | 10 hours |
| Pigment 10: Titanium oxide (anatase type: particle size of 0.23 μm) | 8 hours |

<Preparation of Ink-Jet Ink>

Ink comprising a composition described in table 1 was prepared under a condition of 25° C. and 50% RH and was filtered through a Teflon (a Registered trade mark) membrane filter of 3 μm manufactured by Advatec Corp.

An ink composition which had been stored for one month at 50° C. was also prepared to be subjected to the following image formation.

TABLE 1

| Ink composition 1 (Comparison) | Viscosity of each color: 33-36 mPa·s (25° C.) | K | C | M | Y | W | Lk | Lc | Lm | Ly |
|---|---|---|---|---|---|---|---|---|---|---|
| Pigment | | 1 | 2 | 4 | 3 | 5 | 1 | 2 | 4 | 3 |
| Dispersion | | 7.5 | 7.5 | 16.5 | 13.5 | 40.0 | 1.9 | 1.9 | 4.1 | 3.4 |
| Polymerizing compound (alicyclic epoxy compound, bi-functional) | Celloxide 2021P (Daicel Chemical Industries Ltd.) | 30.0 | 30.0 | 30.0 | 30.0 | 20.0 | 40.0 | 40.0 | 40.0 | 40.0 |
| Polymerizing compound (oxetane compound, bi-functional) | OXT-221 (Toa Gosei Co., Ltd.) | 43.3 | 43.3 | 34.3 | 37.3 | 20.8 | 38.9 | 38.9 | 36.7 | 37.4 |
| Polymerizing compound (oxetane compound, mono-functional) | OXT-101 (Toa Gosei Co., Ltd.) | 5.0 | 5.0 | 5.0 | 5.0 | 5.0 | 5.0 | 5.0 | 5.0 | 5.0 |
| Polymerizing compound (oxetane compound, mono-functional) | OXT-211 (Toa Gosei Co., Ltd.) | 10.0 | 10.0 | 10.0 | 10.0 | 10.0 | 10.0 | 10.0 | 10.0 | 10.0 |
| Surfactant | X-22-4272 (Shin-Etsu Chemical Co., Ltd.) | 0.10 | 0.10 | 0.10 | 0.10 | 0.10 | 0.10 | 0.10 | 0.10 | 0.10 |
| Basic Compound | Triisopropanolamine | 0.10 | 0.10 | 0.10 | 0.10 | 0.10 | 0.10 | 0.10 | 0.10 | 0.10 |
| Photo-initiator | Esacure 1187 (Nihon SibelHegner K.K.) | 4.0 | 4.0 | 4.0 | 4.0 | 4.0 | 4.0 | 4.0 | 4.0 | 4.0 |

TABLE 2

| Ink composition 2 (Comparison) | Viscosity of each color: 33-36 mPa·s (25° C.) | K | C | M | Y | W | Lk | Lc | Lm | Ly |
|---|---|---|---|---|---|---|---|---|---|---|
| Pigment | | 1 | 2 | 4 | 3 | 5 | 1 | 2 | 4 | 3 |
| Dispersion | | 7.5 | 7.5 | 16.5 | 13.5 | 40.0 | 1.9 | 1.9 | 4.1 | 3.4 |
| Urethane modified epoxy (urethane having a reactive group) | Adekaresin EPU-17T-6 (Asahi Denka Co., Ltd.) | 7.5 | 7.5 | 5.0 | 5.0 | 3.0 | 5.0 | 5.0 | 5.0 | 5.0 |
| Polymerizing compound (alicyclic epoxy compound, bi-functional) | EP-1 | 25.0 | 25.0 | 25.0 | 25.0 | 20.0 | 25.0 | 25.0 | 25.0 | 25.0 |
| Polymerizing compound (oxetane compound, bi-functional) | OXT-221 (Toa Gosei Co., Ltd.) | 37.8 | 38.3 | 31.8 | 34.8 | 22.8 | 44.4 | 44.4 | 42.2 | 42.9 |

TABLE 2-continued

| Ink composition 2 (Comparison) | Viscosity of each color: 33-36 mPa·s (25° C.) | K | C | M | Y | W | Lk | Lc | Lm | Ly |
|---|---|---|---|---|---|---|---|---|---|---|
| Polymerizing compound (oxetane compound, mono-functional) | OXT-212 (Toa Gosei Co., Ltd.) | 18.0 | 18.0 | 18.0 | 18.0 | 10.0 | 20.0 | 20.0 | 20.0 | 20.0 |
| Basic compound | N-ethyldiethanolamine | 0.10 | 0.10 | 0.10 | 0.10 | 0.10 | 0.10 | 0.10 | 0.10 | 0.10 |
| Surfactant | KF-352 (Shin-Etsu Chemical Co., Ltd.) | 0.10 | 0.10 | 0.10 | 0.10 | 0.10 | 0.10 | 0.10 | 0.10 | 0.10 |
| Photo-initiator | DTS-102 (Midori Kagaku Co., Ltd.) | 3.0 | 2.5 | 2.5 | 2.5 | 3.0 | 2.5 | 2.5 | 2.5 | 2.5 |
| Sensitizer | DBA (Kawasaki Kasei Chemicals Ltd.) | 1.0 | 1.0 | 1.0 | 1.0 | 1.0 | 1.0 | 1.0 | 1.0 | 1.0 |

TABLE 3

| Ink composition 3 (Invention) | Viscosity of each color: 40-43 mPa·s (25° C.) | K | C | M | Y | W | Lk | Lc | Lm | Ly |
|---|---|---|---|---|---|---|---|---|---|---|
| Pigment | | 1 | 2 | 4 | 3 | 5 | 1 | 2 | 4 | 3 |
| Dispersion | | 7.5 | 7.5 | 16.5 | 13.5 | 40.0 | 1.9 | 1.9 | 4.1 | 3.4 |
| Polymerizing compound (alicyclic epoxy compound, bi-functional) | Celloxide 2021P (Daicel Chemical Industries Ltd.) | 25.0 | 25.0 | 25.0 | 25.0 | 20.0 | 35.0 | 35.0 | 35.0 | 35.0 |
| Polymerizing compound (oxetane compound, bi-functional) | OXT-221 (Toa Gosei Co., Ltd.) | 40.8 | 40.8 | 34.3 | 37.3 | 21.8 | 36.4 | 36.4 | 34.2 | 34.9 |
| Polymerizing compound (oxetane compound, mono-functional) | OXT-101 (Toa Gosei Co., Ltd.) | 5.0 | 5.0 | 5.0 | 5.0 | 3.0 | 5.0 | 5.0 | 5.0 | 5.0 |
| Polymerizing compound (oxetane compound, mono-functional) | OXT-211 (Toa Gosei Co., Ltd.) | 10.0 | 10.0 | 10.0 | 10.0 | 8.0 | 10.0 | 10.0 | 10.0 | 10.0 |
| Exemplary compound | B | 7.5 | 7.5 | 5.0 | 5.0 | 3.0 | 7.5 | 7.5 | 7.5 | 7.5 |
| Surfactant | X-22-4272 (Shin-Etsu Chemical Co., Ltd.) | 0.10 | 0.10 | 0.10 | 0.10 | 0.10 | 0.10 | 0.10 | 0.10 | 0.10 |
| Basic Compound | Triisopropanolamine | 0.10 | 0.10 | 0.10 | 0.10 | 0.10 | 0.10 | 0.10 | 0.10 | 0.10 |
| Photo-initiator | Esacure 1187 (Nihon SibelHegner K.K.) | 4.0 | 4.0 | 4.0 | 4.0 | 4.0 | 4.0 | 4.0 | 4.0 | 4.0 |

TABLE 4

| Ink composition 4 (Invention) | Viscosity of each color: 36-38 mPa·s (25° C.) | K | C | M | Y | W | Lk | Lc | Lm | Ly |
|---|---|---|---|---|---|---|---|---|---|---|
| Pigment | | 1 | 2 | 4 | 3 | 5 | 1 | 2 | 4 | 3 |
| Dispersion | | 7.5 | 7.5 | 16.5 | 13.5 | 40.0 | 1.9 | 1.9 | 4.1 | 3.4 |
| Exemplary compound | A | 10.0 | 10.0 | 7.5 | 10.0 | 5.0 | 10.0 | 10.0 | 10.0 | 10.0 |
| Polymerizing compound (alicyclic epoxy compound, bi-functional) | EP-1 | 20.0 | 20.0 | 20.0 | 20.0 | 15.0 | 25.0 | 25.0 | 25.0 | 25.0 |
| Polymerizing compound (oxetane compound, bi-functional) | OXT-221 (Toa Gosei Co., Ltd.) | 40.3 | 40.8 | 34.3 | 34.8 | 25.8 | 39.4 | 39.4 | 37.2 | 37.9 |
| Polymerizing compound (oxetane compound, mono-functional) | OXT-212 (Toa Gosei Co., Ltd.) | 18.0 | 18.0 | 18.0 | 18.0 | 10.0 | 20.0 | 20.0 | 20.0 | 20.0 |
| Basic compound | N-ethyldiethanolamine | 0.10 | 0.10 | 0.10 | 0.10 | 0.10 | 0.10 | 0.10 | 0.10 | 0.10 |
| Surfactant | KF-352 (Shin-Etsu Chemical Co., Ltd.) | 0.10 | 0.10 | 0.10 | 0.10 | 0.10 | 0.10 | 0.10 | 0.10 | 0.10 |
| Photo-initiator | DTS-102 (Midori Kagaku Co., Ltd.) | 3.0 | 2.5 | 2.5 | 2.5 | 3.0 | 2.5 | 2.5 | 2.5 | 2.5 |
| Sensitizer | DBA (Kawasaki Kasei Chemicals Ltd.) | 1.0 | 1.0 | 1.0 | 1.0 | 1.0 | 1.0 | 1.0 | 1.0 | 1.0 |

TABLE 5

| Ink composition 5 (Invention) | Viscosity of each color: 33-36 mPa·s (25° C.) | K | C | M | Y | W | Lk | Lc | Lm | Ly |
|---|---|---|---|---|---|---|---|---|---|---|
| Pigment | | 1 | 2 | 4 | 3 | 5 | 1 | 2 | 4 | 3 |
| Dispersion | | 12.5 | 12.5 | 21.0 | 15.0 | 40.0 | 3.1 | 3.1 | 5.3 | 3.8 |
| Exemplary compound | B | 7.5 | 7.5 | 7.5 | 7.5 | 7.5 | 7.5 | 7.5 | 7.5 | 7.5 |
| Polymerizing compound (alicyclic epoxy compound, bi-functional) | EP-1 | 20.0 | 20.0 | 20.0 | 20.0 | 15.0 | 25.0 | 25.0 | 25.0 | 25.0 |
| Polymerizing compound (oxetane compound, bi-functional) | OXT-221 (Toa Gosei Co., Ltd.) | 35.8 | 36.3 | 27.8 | 33.8 | 23.3 | 40.7 | 40.7 | 38.6 | 40.1 |
| Polymerizing compound (oxetane compound, mono-functional) | OXT-213 (Toa Gosei Co., Ltd.) | 20.0 | 20.0 | 20.0 | 20.0 | 10.0 | 20.0 | 20.0 | 20.0 | 20.0 |
| Basic compound | N-ethyldiethanolamine | 0.10 | 0.10 | 0.10 | 0.10 | 0.10 | 0.10 | 0.10 | 0.10 | 0.10 |
| Surfactant | KF-352 (Shin-Etsu Chemical Co., Ltd.) | 0.10 | 0.10 | 0.10 | 0.10 | 0.10 | 0.10 | 0.10 | 0.10 | 0.10 |
| Photo-initiator | DTS-102 (Midori Kagaku Co., Ltd.) | 3.0 | 2.5 | 2.5 | 2.5 | 3.0 | 2.5 | 2.5 | 2.5 | 2.5 |
| Sensitizer | DBA (Kawasaki Kasei Chemicals Ltd.) | 1.0 | 1.0 | 1.0 | 1.0 | 1.0 | 1.0 | 1.0 | 1.0 | 1.0 |

TABLE 6

| Ink composition 6 (Invention) | Viscosity of each color: 40-43 mPa·s (25° C.) | K | C | M | Y | W | Lk | Lc | Lm | Ly |
|---|---|---|---|---|---|---|---|---|---|---|
| Pigment | | 1 | 2 | 4 | 3 | 5 | 1 | 2 | 4 | 3 |
| Dispersion | | 12.5 | 12.5 | 21.0 | 15.0 | 40.0 | 3.1 | 3.1 | 5.3 | 3.8 |
| Exemplary compound | C | 5.0 | 5.0 | 3.0 | 3.0 | 3.0 | 5.0 | 5.0 | 5.0 | 5.0 |
| Polymerizing compound (alicyclic epoxy compound, bi-functional) | EP-1 | 20.0 | 20.0 | 20.0 | 20.0 | 15.0 | 25.0 | 25.0 | 25.0 | 25.0 |
| Polymerizing compound (oxetane compound, bi-functional) | OXT-221 (Toa Gosei Co., Ltd.) | 40.3 | 40.8 | 34.3 | 40.3 | 27.8 | 43.2 | 43.2 | 41.1 | 42.6 |
| Polymerizing compound (oxetane compound, mono-functional) | OXT-213 (Toa Gosei Co., Ltd.) | 18.0 | 18.0 | 18.0 | 18.0 | 10.0 | 20.0 | 20.0 | 20.0 | 20.0 |
| Basic compound | N-ethyldiethanolamine | 0.10 | 0.10 | 0.10 | 0.10 | 0.10 | 0.10 | 0.10 | 0.10 | 0.10 |
| Surfactant | KF-352 (Shin-Etsu Chemical Co., Ltd.) | 0.10 | 0.10 | 0.10 | 0.10 | 0.10 | 0.10 | 0.10 | 0.10 | 0.10 |
| Photo-initiator | DTS-102 (Midori Kagaku Co., Ltd.) | 3.0 | 2.5 | 2.5 | 2.5 | 3.0 | 2.5 | 2.5 | 2.5 | 2.5 |
| Sensitizer | DBA (Kawasaki Kasei Chemicals Ltd.) | 1.0 | 1.0 | 1.0 | 1.0 | 1.0 | 1.0 | 1.0 | 1.0 | 1.0 |

TABLE 7

| Ink composition 7 (Invention) | Viscosity of each color: 28-32 mPa·s (25° C.) | K | C | M | Y | W | Lk | Lc | Lm | Ly |
|---|---|---|---|---|---|---|---|---|---|---|
| Pigment | | 1 | 2 | 4 | 3 | 5 | 1 | 2 | 4 | 3 |
| Dispersion | | 12.5 | 12.5 | 21.0 | 15.0 | 40.0 | 3.1 | 3.1 | 5.3 | 3.8 |
| Exemplary compound | D | 5.0 | 5.0 | 3.0 | 3.0 | 3.0 | 5.0 | 5.0 | 5.0 | 5.0 |
| Polymerizing compound (alicyclic epoxy compound, bi-functional) | Celloxide 2021P (Daicel Chemical Industries Ltd.) | 20.0 | 20.0 | 20.0 | 20.0 | 15.0 | 25.0 | 25.0 | 25.0 | 25.0 |
| Polymerizing compound (vinyl ether compound) | CHVE (ISP Japan Ltd.) | 33.4 | 33.9 | 27.4 | 33.4 | 12.9 | 38.3 | 38.3 | 36.2 | 37.7 |
| Polymerizing compound (vinyl ether compound) | DVE-3 (ISP Japan Ltd.) | 10.0 | 10.0 | 10.0 | 10.0 | 10.0 | 10.0 | 10.0 | 10.0 | 10.0 |
| Polymerizing compound (mono-functional epoxy compound) | AOEX 68 (Daicel Chemical Industries Ltd.) | 15.0 | 15.0 | 15.0 | 15.0 | 15.0 | 15.0 | 15.0 | 15.0 | 15.0 |
| Surfactant | KF-352 (Shin-Etsu Chemical Co., Ltd.) | 0.10 | 0.10 | 0.10 | 0.10 | 0.10 | 0.10 | 0.10 | 0.10 | 0.10 |
| Photo-initiator | DTS-102 (Midori Kagaku Co., Ltd.) | 3.0 | 2.5 | 2.5 | 2.5 | 3.0 | 2.5 | 2.5 | 2.5 | 2.5 |
| Sensitizer | DBA (Kawasaki Kasei Chemicals Ltd.) | 1.0 | 1.0 | 1.0 | 1.0 | 1.0 | 1.0 | 1.0 | 1.0 | 1.0 |

TABLE 8

| Ink composition 8 (Comparison) | Viscosity of each color: 33-35 mPa·s (25° C.) | K | C | M | Y | W |
|---|---|---|---|---|---|---|
| Pigment | | 6 | 7 | 9 | 8 | 10 |
| Dispersion | | 20.0 | 20.0 | 21.0 | 17.5 | 40.0 |
| Polymerizing compound | Stearyl acrylate (mono-functional) | 15 | 15 | 15 | 15 | 10 |
| Polymerizing compound | Polyethyleneglycol diacrylate (bi-functional) n is approximately 9 | 41.0 | 41.0 | 40.0 | 43.5 | 33.0 |
| Polymerizing compound | Trimethylolpropane triethyleneoxide modified triacrylate(tri-functional) | 20.0 | 20.0 | 20.0 | 20.0 | 13.0 |
| Photo-induced radical generator | Irgacure 1850 (Ciba Specialty Chemicals Corp.) | 2.0 | 2.0 | 2.0 | 2.0 | 2.0 |
| Photo-induced radical generator | Irgacure 651 (Ciba Specialty Chemicals Corp.) | 2.0 | 2.0 | 2.0 | 2.0 | 2.0 |

TABLE 9

| Ink composition 9 (Comparison) | Viscosity of each color: 34-37 mPa·s (25° C.) | K | C | M | Y | W |
|---|---|---|---|---|---|---|
| Pigment | | 6 | 7 | 9 | 8 | 10 |
| Dispersion | | 20.0 | 20.0 | 21.0 | 17.5 | 40.0 |
| Photo-Polymerizing compound | Methoxypropyleneglycol acrylate (mono-functional) | 15.0 | 15.0 | 15.0 | 15.0 | 8.0 |
| Polymerizing compound | Polypropyleneglycol (PO containing) diacrylate (bi-functional) | 43.5 | 43.5 | 45.0 | 48.5 | 35.0 |
| Polymerizing compound | Trimethylolpropane triacrylate (tri-functional) | 10.0 | 10.0 | 10.0 | 10.0 | 10.0 |
| Urethane acrylate (urethane having a reactive group) | UN-333 (Negami Chemical Industrial Co., Ltd.) | 7.5 | 7.5 | 5.0 | 5.0 | 3.0 |
| Photo-induced radical generator | Irgacure 1850 (Ciba Specialty Chemicals Corp.) | 2.0 | 2.0 | 2.0 | 2.0 | 2.0 |
| Photo-induced radical generator | Irgacure 651 (Ciba Specialty Chemicals Corp.) | 2.0 | 2.0 | 2.0 | 2.0 | 2.0 |

TABLE 10

| Ink composition 10 (Comparison) | Viscosity of each color: 30-34 mPa·s (25° C.) | K | C | M | Y | W |
|---|---|---|---|---|---|---|
| Pigment | | 6 | 7 | 9 | 8 | 10 |
| Dispersion | | 20.0 | 20.0 | 21.0 | 17.5 | 40.0 |
| Exemplary compound | E | 10.0 | 10.0 | 10.0 | 10.0 | 7.5 |
| Polymerizing compound | Stearyl acrylate (mono-functional) | 15 | 15 | 15 | 15 | 10 |
| Polymerizing compound | Polyethyleneglycol diacrylate (bi-functional), n is approximately 9 | 41.0 | 41.0 | 40.0 | 43.5 | 30.5 |
| Polymerizing compound | Trimethylolpropane triethyleneoxide modified triacrylate (tri-functional) | 10.0 | 10.0 | 10.0 | 10.0 | 8.0 |
| Photo-induced radical generator | Irgacure 1850 (Ciba Specialty Chemicals Corp.) | 2.0 | 2.0 | 2.0 | 2.0 | 2.0 |
| Photo-induced radical generator | Irgacure 651 (Ciba Specialty Chemicals Corp.) | 2.0 | 2.0 | 2.0 | 2.0 | 2.0 |

TABLE 11

| Ink composition 11 (Invention) | Viscosity of each color: 28-32 mPa·s (25° C.) | K | C | M | Y | W |
|---|---|---|---|---|---|---|
| Pigment | | 6 | 7 | 9 | 8 | 10 |
| Dispersion | | 20.0 | 20.0 | 21.0 | 17.5 | 40.0 |
| Exemplary compound | F | 7.5 | 7.5 | 7.5 | 7.5 | 7.5 |
| Polymerizing compound | Cetyl acrylate (mono-functional) | 15 | 15 | 15 | 15 | 10 |
| Polymerizing compound | N-vinyl ε-caploractum (mono-functional) | 15 | 15 | 15 | 15 | 10 |
| Polymerizing compound | Polyethyleneglycol diacrylate (bi-functional), n is approximately 9 | 28.5 | 28.5 | 27.5 | 31.0 | 20.5 |
| Polymerizing compound | Caploractum modified dipentaerythritol hexaacrylate (hexa-functional) | 10.0 | 10.0 | 10.0 | 10.0 | 8.0 |
| Photo-induced radical generator | Irgacure 1850 (Ciba Specialty Chemicals Corp.) | 2.0 | 2.0 | 2.0 | 2.0 | 2.0 |
| Photo-induced radical generator | Irgacure 651 (Ciba Specialty Chemicals Corp.) | 2.0 | 2.0 | 2.0 | 2.0 | 2.0 |

TABLE 12

| Ink composition 12 (Invention) | Viscosity of each color: 33-35 mPa·s (25° C.) | K | C | M | Y | W |
|---|---|---|---|---|---|---|
| Pigment | | 6 | 7 | 9 | 8 | 10 |
| Dispersion | | 20.0 | 20.0 | 21.0 | 17.5 | 40.0 |
| Exemplary compound | G | 5.0 | 5.0 | 3.0 | 3.0 | 3.0 |
| Polymerizing compound | Stearyl acrylate (mono-functional) | 15 | 15 | 15 | 15 | 5 |
| Polymerizing compound | N-vinyl ε-caploractum (mono-functional) | 20 | 20 | 20 | 20 | 20 |
| Polymerizing compound | Polyethyleneglycol diacrylate (bi-functional), n is approximately 9 | 26.0 | 26.0 | 27.0 | 30.5 | 20.0 |
| Polymerizing compound | Caploractum modified dipentaerythritol hexaacrylate (hexa-functional) | 10.0 | 10.0 | 10.0 | 10.0 | 8.0 |
| Photo-induced radical generator | Irgacure 907 (Ciba Specialty Chemicals Corp.) | 2.0 | 2.0 | 2.0 | 2.0 | 2.0 |
| Photo-induced radical generator | Irgacure 184 (Ciba Specialty Chemicals Corp.) | 2.0 | 2.0 | 2.0 | 2.0 | 2.0 |

TABLE 13

| Ink composition 13 (Invention) | Viscosity of each color: 35-38 mPa·s (25° C.) | K | C | M | Y | W |
|---|---|---|---|---|---|---|
| Pigment | | 6 | 7 | 9 | 8 | 10 |
| Dispersion | | 20.0 | 20.0 | 21.0 | 17.5 | 40.0 |
| Exemplary compound | H | 5.0 | 5.0 | 3.0 | 3.0 | 3.0 |
| Polymerizing compound | Cetyl acrylate (mono-functional) | 10 | 10 | 10 | 10 | 10 |
| Polymerizing compound | N-vinyl ε-caploractum (mono-functional) | 26.0 | 26.0 | 27.0 | 30.5 | 20.0 |
| Polymerizing compound | Polyethyleneglycol diacrylate (bi-functional), n is approximately 9 | 25.0 | 25.0 | 25.0 | 25.0 | 13.0 |
| Polymerizing compound | Caploractum modified dipentaerythritol hexaacrylate (hexa-functional) | 10.0 | 10.0 | 10.0 | 10.0 | 10.0 |
| Photo-induced radical generator | Irgacure 184 (Ciba Specialty Chemicals Corp.) | 2.0 | 2.0 | 2.0 | 2.0 | 2.0 |
| Photo-induced radical generator | Irgacure 369 (Ciba Specialty Chemicals Corp.) | 2.0 | 2.0 | 2.0 | 2.0 | 2.0 |

The details of expressions described in tables 1-13 are as follows.
K: deep black ink
C: deep cyan ink
M: deep magenta ink
Y: deep yellow ink
W: white ink
Lk: light black ink
Lc: light cyan ink
Lm: light magenta ink
Ly: light yellow ink

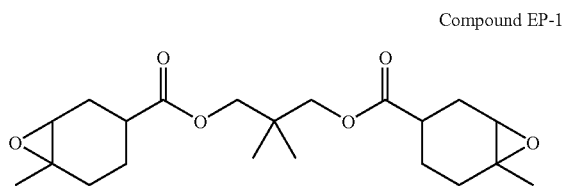

Compound EP-1

<Ink-Jet Image Forming Method>

On an ink-jet recorder equipped with a piezo type ink-jet nozzle and having a constitution described in FIG. 1, each ink composition set 1-7 prepared above was mounted, and the following image recording was continuously performed on each recording material of 600 mm wide and 500 m long described on the tables. As an image data, "High precision color digital standard image data <N5 bycicle> (published by Foundation, Japanese Standards Association, in December 1995)" was employed. An ink supply system is constituted of an ink tank, a supply pipe, a pre-room ink tank immediately before the head, piping equipped with a filter and a piezo head, and the portion from the pre-room tank till the head was heat insulated and heated at 50° C. The piezo head was driven so as to eject multi-size dots of 2-15 pl at a resolution of 720×720 dpi (dpi is a dot number per 2.54 cm) and continuously ejected each ink. The ink drops, after having been landed, were cured in a moment (within less than 2 seconds after landing) by lamp units on the both side of a carriage. The total ink layer thickness after recording was measured to be 2.3-20 μm. Herein, ink-jet image formation was performed according to the above-described method under an intermediate humidity environment of 25° C. and 50% RH.

Further, quite similarly, images were formed by use of an ink-jet recorder of the line head type described in FIG. 2 utilizing ink composition sets 8-13.

Such as conditions of image formation will be summarized in tables 14-20.

TABLE 14

| Sample No. | Ink | Aging | Recording material | Irradiation Condition | | | *5 Illuminance on recording material surface at peak wave length | Remarks |
| | | | | Irradiation light source | Irradiation timing | Irradiation procedure (Area) | | |
| --- | --- | --- | --- | --- | --- | --- | --- | --- |
| 1 | **1 | *1 | PET | *2 | *3 | *4 | 400 mW/cm$^2$ | Comp. |
| 2 | **1 | *1 | PVC | *2 | *3 | *4 | 400 mW/cm$^2$ | Comp. |
| 3 | **1 | *1 | Polyester fiber | *2 | *3 | *4 | 400 mW/cm$^2$ | Comp. |
| 4 | **1 | at 50° C. for 1 month | PET | *2 | *3 | *4 | 400 mW/cm$^2$ | Comp. |
| 5 | **1 | at 50° C. for 1 month | PVC | *2 | *3 | *4 | 400 mW/cm$^2$ | Comp. |
| 6 | **1 | at 50° C. for 1 month | Polyester fiber | *2 | *3 | *4 | 400 mW/cm$^2$ | Comp. |
| 7 | **2 | *1 | PET | *2 | *3 | *4 | 400 mW/cm$^2$ | Comp. |
| 8 | **2 | *1 | PVC | *2 | *3 | *4 | 400 mW/cm$^2$ | Comp. |
| 9 | **2 | *1 | Polyester fiber | *2 | *3 | *4 | 400 mW/cm$^2$ | Comp. |
| 10 | **2 | at 50° C. for 1 month | PET | *2 | *3 | *4 | 400 mW/cm$^2$ | Comp. |
| 11 | **2 | at 50° C. for 1 month | PVC | *2 | *3 | *4 | 400 mW/cm$^2$ | Comp. |
| 12 | **2 | at 50° C. for 1 month | Polyester fiber | *2 | *3 | *4 | 400 mW/cm$^2$ | Comp. |

*1: Without aging (evaluation immediately after preparation),
Comp.: Comparison
*2: High pressure mercury lamp VZero 085 (manufactured by Integration Technology)
*3: After 0.1 second after landing,
*4: Both sides of recording head, FIG. 1
*5: Illuminance at 254 nm was measured with UVPF-A1 (produced by Iwasaki Electric Co., Ltd.),
**Ink composition

TABLE 15

| Sample No. | Ink | Aging | Recording material | Irradiation Condition | | | *5 Illuminance on recording material surface at peak wave length | Remarks |
| | | | | Irradiation light source | Irradiation timing | Irradiation procedure (Area) | | |
| --- | --- | --- | --- | --- | --- | --- | --- | --- |
| 13 | **3 | *1 | PET | *2 | *3 | *4 | 400 mW/cm$^2$ | Inv.. |
| 14 | **3 | *1 | PVC | *2 | *3 | *4 | 400 mW/cm$^2$ | Inv. |
| 15 | **3 | *1 | Polyester fiber | *2 | *3 | *4 | 400 mW/cm$^2$ | Inv. |
| 16 | **3 | at 50° C. for 1 month | PET | *2 | *3 | *4 | 400 mW/cm$^2$ | Inv. |
| 17 | **3 | at 50° C. for 1 month | PVC | *2 | *3 | *4 | 400 mW/cm$^2$ | Inv. |

TABLE 15-continued

| Sample No. | Ink | Aging | Recording material | Irradiation Condition Irradiation light source | Irradiation timing | Irradiation procedure (Area) | *5 Illuminance on recording material surface at peak wave length | Remarks |
| --- | --- | --- | --- | --- | --- | --- | --- | --- |
| 18 | **3 | at 50° C. for 1 month | Polyester fiber | *2 | *3 | *4 | 400 mW/cm² | Inv. |
| 19 | **4 | *1 | PET | *2 | *3 | *4 | 400 mW/cm² | Inv. |
| 20 | **4 | *1 | PVC | *2 | *3 | *4 | 400 mW/cm² | Inv. |
| 21 | **4 | *1 | Polyester fiber | *2 | *3 | *4 | 400 mW/cm² | Inv. |
| 22 | **4 | at 50° C. for 1 month | PET | *2 | *3 | *4 | 400 mW/cm² | Inv. |
| 23 | **4 | at 50° C. for 1 month | PVC | *2 | *3 | *4 | 400 mW/cm² | Inv. |
| 24 | **4 | at 50° C. for 1 month | Polyester fiber | *2 | *3 | *4 | 400 mW/cm² | Inv. |

*1: Without aging (evaluation immediately after preparation),
Inv.: Invention
*2: High pressure mercury lamp VZero 085 (manufactured by Integration Technology)
*3: After 0.1 second after landing,
*4: Both sides of recording head, FIG. 1
*5: Illuminance at 254 nm was measured with UVPF-A1 (produced by Iwasaki Electric Co., Ltd.),
**Ink composition

TABLE 16

| Sample No. | Ink | Aging | Recording material | Irradiation Condition Irradiation light source | Irradiation timing | Irradiation procedure (Area) | *5 Illuminance on recording material surface at peak wave length | Remarks |
| --- | --- | --- | --- | --- | --- | --- | --- | --- |
| 25 | **5 | *1 | PET | *2 | *3 | *4 | 400 mW/cm² | Inv.. |
| 26 | **5 | *1 | PVC | *2 | *3 | *4 | 400 mW/cm² | Inv. |
| 27 | **5 | *1 | Polyester fiber | *2 | *3 | *4 | 400 mW/cm² | Inv. |
| 28 | **5 | at 50° C. for 1 month | PET | *2 | *3 | *4 | 400 mW/cm² | Inv. |
| 29 | **5 | at 50° C. for 1 month | PVC | *2 | *3 | *4 | 400 mW/cm² | Inv. |
| 30 | **5 | at 50° C. for 1 month | Polyester fiber | *2 | *3 | *4 | 400 mW/cm² | Inv. |
| 31 | **6 | *1 | PET | *2 | *3 | *4 | 400 mW/cm² | Inv. |
| 32 | **6 | *1 | PVC | *2 | *3 | *4 | 400 mW/cm² | Inv. |
| 33 | **6 | *1 | Polyester fiber | *2 | *3 | *4 | 400 mW/cm² | Inv. |
| 34 | **6 | at 50° C. for 1 month | PET | *2 | *3 | *4 | 400 mW/cm² | Inv. |
| 35 | **6 | at 50° C. for 1 month | PVC | *2 | *3 | *4 | 400 mW/cm² | Inv. |
| 36 | **6 | at 50° C. for 1 month | Polyester fiber | *2 | *3 | *4 | 400 mW/cm² | Inv. |

*1: Without aging (evaluation immediately after preparation),
Inv.: Invention
*2: High pressure mercury lamp VZero 085 (manufactured by Integration Technology)
*3: After 0.1 second after landing,
*4: Both sides of recording head, FIG. 1
*5: Illuminance at 254 nm was measured with UVPF-A1 (produced by Iwasaki Electric Co., Ltd.),
**Ink composition

TABLE 17

| Sample No. | Ink | Aging | Recording material | Irradiation Condition Irradiation light source | Irradiation timing | Irradiation procedure (Area) | *5 Illuminance on recording material surface at peak wave length | Remarks |
| --- | --- | --- | --- | --- | --- | --- | --- | --- |
| 37 | **7 | *1 | PET | *2 | *3 | *4 | 400 mW/cm² | Inv.. |
| 38 | **7 | *1 | PVC | *2 | *3 | *4 | 400 mW/cm² | Inv. |

TABLE 17-continued

| Sample No. | Ink | Aging | Recording material | Irradiation Condition - Irradiation light source | Irradiation timing | Irradiation procedure (Area) | *5 Illuminance on recording material surface at peak wave length | Remarks |
|---|---|---|---|---|---|---|---|---|
| 39 | **7 | *1 | Polyester fiber | *2 | *3 | *4 | 400 mW/cm² | Inv. |
| 40 | **7 | at 50° C. for 1 month | PET | *2 | *3 | *4 | 400 mW/cm² | Inv. |
| 41 | **7 | at 50° C. for 1 month | PVC | *2 | *3 | *4 | 400 mW/cm² | Inv. |
| 42 | **7 | at 50° C. for 1 month | Polyester fiber | *2 | *3 | *4 | 400 mW/cm² | Inv. |

*1: Without aging (evaluation immediately after preparation),
Inv.: Invention
*2: High pressure mercury lamp VZero 085 (manufactured by Integration Technology)
*3: After 0.1 second after landing,
*4: Both sides of recording head, FIG. 1
*5: Illuminance at 254 nm was measured with UVPF-A1 (produced by Iwasaki Electric Co., Ltd.),
**Ink composition

TABLE 18

| Sample No. | Ink | Aging | Recording material | Irradiation Condition - Irradiation light source | Irradiation timing | Irradiation procedure (Area) | *5 Illuminance on recording material surface at peak wave length | Remarks |
|---|---|---|---|---|---|---|---|---|
| 43 | **8 | *1 | PET | *2 | *3 | *4 | 600 mW/cm² | Comp. |
| 44 | **8 | *1 | PVC | *2 | *3 | *4 | 600 mW/cm² | Comp. |
| 45 | **8 | *1 | Polyester fiber | *2 | *3 | *4 | 600 mW/cm² | Comp. |
| 46 | **8 | at 50° C. for 1 month | PET | *2 | *3 | *4 | 600 mW/cm² | Comp. |
| 47 | **8 | at 50° C. for 1 month | PVC | *2 | *3 | *4 | 600 mW/cm² | Comp. |
| 48 | **8 | at 50° C. for 1 month | Polyester fiber | *2 | *3 | *4 | 600 mW/cm² | Comp. |
| 49 | **9 | *1 | PET | *2 | *3 | *4 | 600 mW/cm² | Comp. |
| 50 | **9 | *1 | PVC | *2 | *3 | *4 | 600 mW/cm² | Comp. |
| 51 | **9 | *1 | Polyester fiber | *2 | *3 | *4 | 600 mW/cm² | Comp. |
| 52 | **9 | at 50° C. for 1 month | PET | *2 | *3 | *4 | 600 mW/cm² | Comp. |
| 53 | **9 | at 50° C. for 1 month | PVC | *2 | *3 | *4 | 600 mW/cm² | Comp. |
| 54 | **9 | at 50° C. for 1 month | Polyester fiber | *2 | *3 | *4 | 600 mW/cm² | Comp. |

*1: Without aging (evaluation immediately after preparation),
Comp.: Comparison
*2: 120 W/cm metal halide lamp (by Japan Battery Co., Ltd. MAL 400NL)
*3: After 0.1 second after landing,
*4: Liner light source irradiation downstream along recording material transport direction, FIG. 2
*5: Illuminance at 254 nm was measured with UVPF-A1 (produced by Iwasaki Electric Co., Ltd.),
**Ink composition

TABLE 19

| Sample No. | Ink | Aging | Recording material | Irradiation Condition - Irradiation light source | Irradiation timing | Irradiation procedure (Area) | *5 Illuminance on recording material surface at peak wave length | Remarks |
|---|---|---|---|---|---|---|---|---|
| 55 | **10 | *1 | PET | *2 | *3 | *4 | 600 mW/cm² | Inv. |
| 56 | **10 | *1 | PVC | *2 | *3 | *4 | 600 mW/cm² | Inv. |
| 57 | **10 | *1 | Polyester fiber | *2 | *3 | *4 | 600 mW/cm² | Inv. |
| 58 | **10 | at 50° C. for 1 month | PET | *2 | *3 | *4 | 600 mW/cm² | Inv. |
| 59 | **10 | at 50° C. for 1 month | PVC | *2 | *3 | *4 | 600 mW/cm² | Inv. |

TABLE 19-continued

| Sample No. | Ink | Aging | Recording material | Irradiation Condition - Irradiation light source | Irradiation timing | Irradiation procedure (Area) | *5 Illuminance on recording material surface at peak wave length | Remarks |
|---|---|---|---|---|---|---|---|---|
| 60 | **10 | at 50° C. for 1 month | Polyester fiber | *2 | *3 | *4 | 600 mW/cm² | Inv. |
| 61 | **11 | *1 | PET | *2 | *3 | *4 | 600 mW/cm² | Inv. |
| 62 | **11 | *1 | PVC | *2 | *3 | *4 | 600 mW/cm² | Inv. |
| 63 | **11 | *1 | Polyester fiber | *2 | *3 | *4 | 600 mW/cm² | Inv. |
| 64 | **11 | at 50° C. for 1 month | PET | *2 | *3 | *4 | 600 mW/cm² | Inv. |
| 65 | **11 | at 50° C. for 1 month | PVC | *2 | *3 | *4 | 600 mW/cm² | Inv. |
| 66 | **11 | at 50° C. for 1 month | Polyester fiber | *2 | *3 | *4 | 600 mW/cm² | Inv. |

*1: Without aging (evaluation immediately after preparation),
Inv.: Invention
*2: 120 W/cm metal halide lamp (by Japan Battery Co., Ltd. MAL 400NL)
*3: After 0.1 second after landing,
*4: Liner light source irradiation downstream along recording material transport direction, FIG. 2
*5: Illuminance at 254 nm was measured with UVPF-A1 (produced by Iwasaki Electric Co., Ltd.),
**Ink composition

TABLE 20

| Sample No. | Ink | Aging | Recording material | Irradiation Condition - Irradiation light source | Irradiation timing | Irradiation procedure (Area) | *5 Illuminance on recording material surface at peak wave length | Remarks |
|---|---|---|---|---|---|---|---|---|
| 67 | **12 | *1 | PET | *2 | *3 | *4 | 600 mW/cm² | Inv. |
| 68 | **12 | *1 | PVC | *2 | *3 | *4 | 600 mW/cm² | Inv. |
| 69 | **12 | *1 | Polyester fiber | *2 | *3 | *4 | 600 mW/cm² | Inv. |
| 70 | **12 | at 50° C. for 1 month | PET | *2 | *3 | *4 | 600 mW/cm² | Inv. |
| 71 | **12 | at 50° C. for 1 month | PVC | *2 | *3 | *4 | 600 mW/cm² | Inv. |
| 72 | **12 | at 50° C. for 1 month | Polyester fiber | *2 | *3 | *4 | 600 mW/cm² | Inv. |
| 73 | **13 | *1 | PET | *2 | *3 | *4 | 600 mW/cm² | Inv. |
| 74 | **13 | *1 | PVC | *2 | *3 | *4 | 600 mW/cm² | Inv. |
| 75 | **13 | *1 | Polyester fiber | *2 | *3 | *4 | 600 mW/cm² | Inv. |
| 76 | **13 | at 50° C. for 1 month | PET | *2 | *3 | *4 | 600 mW/cm² | Inv. |
| 77 | **13 | at 50° C. for 1 month | PVC | *2 | *3 | *4 | 600 mW/cm² | Inv. |
| 78 | **13 | at 50° C. for 1 month | Polyester fiber | *2 | *3 | *4 | 600 mW/cm² | Inv. |

*1: Without aging (evaluation immediately after preparation),
Inv.: Invention
*2: 120 W/cm metal halide lamp (by Japan Battery Co., Ltd. MAL 400NL)
*3: After 0.1 second after landing,
*4: Liner light source irradiation downstream along recording material transport direction, FIG. 2
*5: Illuminance at 254 nm was measured with UVPF-A1 (produced by Iwasaki Electric Co., Ltd.),
**Ink composition <Evaluation of Ink-Jet Recorded Image>

With respect to each image recorded by the above-described image forming method, evaluation at the time of 10 m output was performed to judge whether an image can be formed without problems.

(Color Mixing (Bleeding, Wrinkles)) with PET

Printing at 720 dpi was performed so that each one dot of Y, M, C and K colors is adjacent to each other, and each color dot was magnified through a lope to observe the degree of bleeding, whereby color mixing was evaluated according to the following criteria.

A: Adjacent dot shapes keep a true circle without bleeding.

B: Adjacent dot shapes keep almost true circle with little bleeding.

C: Adjacent dots show slight bleeding and dot shapes are slightly deformed; however, which is a barely usable level.

D: Adjacent dots show bleeding, and wrinkles are generated at the accumulated portion of dots; which is an unusable level.

<Physical Properties Evaluation of Cured Ink Film>

The following physical properties evaluation of cured film was performed, utilizing 10 cm² size samples of an image formed by the aforesaid image forming method having a cured ink layer thickness of 20 μm at the time of 10 m output under an intermediate humidity environment of 25° C. and 50% RH.

<Evaluation Method of Cured Film>

1) With respect to PET and PVC

Hardness of each cured product was measured according to Pencil Scratch Test (JIS K 5400).

The rank of hardness is in the order of (soft) 6B-B, HB, F, H-9H (hard); 6B is the softest, 9H is the hardest, and the harder, the preferable.

2) With respect to PVC and polyester

Grid Tape Peel-off Residual Adhesion Ratio Test: Adhesive tape (Scotch #250 manufactured by Sumitomo 3M), after having been pasted on cured composition samples prepared in the grid test of JIS K 5400 to be pressed back and forth by a roller of 2 kg, was peeled off at a dash, and the number of remaining grid form samples was examined. The larger is the residual ratio, the preferable.

3) With respect to PVC and polyester

Flexibility Test of Cured Film

Evaluation was made based on the degree of cracking at the time of bending the samples.

The evaluation was made based on the following criteria.

A: No cracking is generated at all by bending.

B: Cracking generation is recognized by plural times of bending.

C: Cracking is generated by bending.

The above evaluation results will be summarized in tables 21 and 22.

TABLE 21

| Sample No. | Color mixing (bleeding, wrinkle) | Pencil scratch hardness | Adhesion residual ratio | Flexibility | Remarks |
|---|---|---|---|---|---|
| 1 | D | 4B | — | — | Comparison |
| 2 | — | 3B | 55% | D | Comparison |
| 3 | — | — | 50% | D | Comparison |
| 4 | D | 4B | — | — | Comparison |
| 5 | — | 3B | 50% | D | Comparison |
| 6 | — | — | 45% | D | Comparison |
| 7 | B | 3H | — | — | Comparison |
| 8 | — | 2H | 55% | D | Comparison |
| 9 | — | — | 60% | D | Comparison |
| 10 | D | H | — | — | Comparison |
| 11 | — | 2H | 60% | D | Comparison |
| 12 | — | — | 60% | D | Comparison |
| 13 | B | 3H | — | — | Invention |
| 14 | — | 2H | 80% | B | Invention |
| 15 | — | — | 80% | B | Invention |
| 16 | C | 3H | — | — | Invention |
| 17 | — | 2H | 80% | B | Invention |
| 18 | — | — | 80% | B | Invention |
| 19 | A | 4H | — | — | Invention |
| 20 | — | 4H | 95% | A | Invention |
| 21 | — | — | 90% | A | Invention |
| 22 | A | 3H | — | — | Invention |
| 23 | — | 3H | 90% | A | Invention |
| 24 | — | — | 90% | A | Invention |
| 25 | A | 4H | — | — | Invention |
| 26 | — | 4H | 95% | A | Invention |
| 27 | — | — | 90% | A | Invention |
| 28 | A | 3H | — | — | Invention |
| 29 | — | 3H | 90% | A | Invention |
| 30 | — | — | 90% | A | Invention |

TABLE 21-continued

| Sample No. | Color mixing (bleeding, wrinkle) | Pencil scratch hardness | Adhesion residual ratio | Flexibility | Remarks |
|---|---|---|---|---|---|
| 31 | C | 3H | — | — | Invention |
| 32 | — | 2H | 70% | B | Invention |
| 33 | — | — | 70% | B | Invention |
| 34 | C | 2H | — | — | Invention |
| 35 | — | 2H | 70% | B | Invention |
| 36 | — | — | 70% | B | Invention |
| 37 | C | 4B | — | — | Invention |
| 38 | — | 3B | 70% | B | Invention |
| 39 | — | — | 70% | B | Invention |
| 40 | C | 3H | — | — | Invention |
| 41 | — | 2H | 65% | C | Invention |
| 42 | — | — | 70% | B | Invention |

TABLE 22

| Sample No. | Color mixing (bleeding, wrinkle) | Pencil scratch hardness | Adhesion residual ratio | Flexibility | Remarks |
|---|---|---|---|---|---|
| 43 | D | 4B | — | — | Comparison |
| 44 | — | 3B | 55% | D | Comparison |
| 45 | — | — | 50% | D | Comparison |
| 46 | D | 4B | — | — | Comparison |
| 47 | — | 3B | 50% | D | Comparison |
| 48 | — | — | 45% | D | Comparison |
| 49 | B | 3H | — | — | Comparison |
| 50 | — | 2H | 50% | D | Comparison |
| 51 | — | — | 50% | D | Comparison |
| 52 | C | 2H | — | — | Comparison |
| 53 | — | 2H | 60% | D | Comparison |
| 54 | — | — | 60% | D | Comparison |
| 55 | A | 4H | — | — | Invention |
| 56 | — | 4H | 95% | A | Invention |
| 57 | — | — | 95% | A | Invention |
| 58 | A | 3H | — | — | Invention |
| 59 | — | 3H | 90% | A | Invention |
| 60 | — | — | 90% | A | Invention |
| 61 | A | 4H | — | — | Invention |
| 62 | — | 4H | 95% | A | Invention |
| 63 | — | — | 90% | A | Invention |
| 64 | A | 3H | — | — | Invention |
| 65 | — | 3H | 90% | A | Invention |
| 66 | — | — | 90% | A | Invention |
| 67 | C | 3H | — | — | Invention |
| 68 | — | 2H | 70% | B | Invention |
| 69 | — | — | 70% | B | Invention |
| 70 | C | 2H | — | — | Invention |
| 71 | — | 2H | 70% | B | Invention |
| 72 | — | — | 70% | A | Invention |
| 73 | C | 4B | — | — | Invention |
| 74 | — | 3B | 65% | C | Invention |
| 75 | — | — | 70% | B | Invention |
| 76 | C | 3H | — | — | Invention |
| 77 | — | 2H | 65% | C | Invention |
| 78 | — | — | 70% | B | Invention |

It is clear from the results described in tables 21 and 22 that ink composition sets comprising ink compositions according to this invention are superior in color mixing resistance, hardness of cured film, peel-off resistance (peel-off residual ratio) and flexibility regardless of storage temperature and period, compared to comparative ink composition sets.

(Evaluation of Actinic Radiation Curable Ink)

<Preparation of Dispersion>

Pigment of the following composition was dispersed.

[Cationic Polymerizing System]

The following two types of compounds were charged in a stainless beaker and dissolved with stirring for 1 hour while heated on a hot plate of 65° C.

| | |
|---|---|
| PB 822 (dispersant, manufactured by Ajinomoto Finetechno Co., Ltd.) | 16 parts |
| OXT-221 (manufactured by Toa Gosei Co., Ltd.) | 44 parts |

The system, after having been cooled down to room temperature, was added with 40 parts of the following pigment and sealed in a glass bottle together with 200 g of zirconia beads having a diameter of 0.5 mm. The resulting system was subjected to dispersion treatment for the following time by a paint shaker and then zirconia beads were removed.

| | |
|---|---|
| Pigment 11: Pigment Red 122 (Chromofine Red, manufactured by Dainichiseika Color & Chemicals Mfg. Co., Ltd.) | 8 hours |

[Radical Polymerization System]

The following two types of compounds were charged in a stainless beaker and dissolved with stirring for 1 hour while heated on a hot plate of 65° C.

| | |
|---|---|
| Solsperse 32000 (dispersant, manufactured by Avecia Corp) | 18 parts |
| Tetraethyleneglycol diacrylate | 42 parts |

The system, after having been cooled down to room temperature, was added with 40 parts of the following pigment and sealed in a glass bottle together with 200 g of zirconia beads having a diameter of 0.5 mm. The resulting system was subjected to dispersion treatment for the following time by a paint shaker and then zirconia beads were removed.

| | |
|---|---|
| Pigment 12: Pigment Red 122 (PV FAST PINK E, manufactured by Clariant Corp.) | 10 hours |

<Preparation of Actinic Radiation Curable Ink>

Actinic radiation curable ink was prepared by mixing and dissolving the compositions described in tables 23-31.

TABLE 23

| Curable Composition 1 (Comparison) | | Content (weight %) |
|---|---|---|
| Dispersion | Pigment 11 | 30.0 |
| Exemplary compound | | 0.0 |
| Polymerizing compound (alicyclic epoxy compound) | Celloxide 2021P (Daicel Chemical Industries Ltd.) | 20.0 |
| Polymerizing compound (oxetane compound) | OXT-221 (Toa Gosei Co., Ltd.) | 37.0 |
| Polymerizing compound (mono-functional oxetane compound) | OXT-101 (Toa Gosei Co., Ltd.) | 8.0 |
| Photo-induced acid generator Propylene carbonate 50% solution | UV 16992 (Dow Chemical) | 5.0 |

TABLE 24

| Curable Composition 2 (Comparison) | | Content (weight %) |
|---|---|---|
| Dispersion | Pigment 12 | 30.0 |
| Exemplary compound | | 0.0 |
| Polymerizing compound | Lauryl acrylate (mono-functional) | 30.0 |
| Polymerizing compound | Tetraethyleneglycol diacrylate (bi-functional) | 20.0 |
| Polymerizing compound | Trimethylolpropane triacrylate (tri-functional) | 16.0 |
| Photo-induced acid generator | Irgacure 819 (manufactured by Ciba Specialty Chemicals Corp.) | 2.0 |
| Photo-induced acid generator | Irgacure 184 (manufactured by Ciba Specialty Chemicals Corp.) | 2.0 |

TABLE 25

| Curable Composition 3 (Invention) | | Content (weight %) |
|---|---|---|
| Dispersion | Pigment 11 | 30.0 |
| Exemplary compound | A | 20.0 |
| Polymerizing compound (alicyclic epoxy compound) | Celloxide 2021P (Daicel Chemical Industries Ltd.) | 35.0 |
| Polymerizing compound (oxetane compound) | OXT-221 (Toa Gosei Co., Ltd.) | 5.0 |
| Polymerizing compound (mono-functional oxetane compound) | OXT-101 (Toa Gosei Co., Ltd.) | 5.0 |
| Photo-induced acid generator Propylene carbonate 50% solution | UV 16992 (Dow Chemical) | 5.0 |

TABLE 26

| Curable Composition 4 (Invention) | | Content (weight %) |
|---|---|---|
| Exemplary compound | Pigment 12 | 30.0 |
| Exemplary compound | E | 20.0 |
| Polymerizing compound | Lauryl acrylate (mono-functional) | 10.0 |
| Polymerizing compound | Tetraethyleneglycol diacrylate (bi-functional) | 28.0 |
| Polymerizing compound | Trimethylolpropane triacrylate (tri-functional) | 8.0 |
| Photo-induced acid generator | Irgacure 819 (manufactured by Ciba Specialty Chemicals Corp.) | 2.0 |
| Photo-induced acid generator | Irgacure 184 (manufactured by Ciba Specialty Chemicals Corp.) | 2.0 |

TABLE 27

| Curable Composition 5 (Invention) | | Content (weight %) |
|---|---|---|
| Dispersion | Pigment 11 | 30.0 |
| Exemplary compound | B | 15.0 |
| Polymerizing compound (alicyclic epoxy compound) | Celloxide 2021P (Daicel Chemical Industries Ltd.) | 24.0 |

TABLE 27-continued

| Curable Composition 5 (Invention) | | Content (weight %) |
|---|---|---|
| Polymerizing compound (oxetane compound) | OXT-221 (Toa Gosei Co., Ltd.) | 10.0 |
| Polymerizing compound (mono-functional oxetane compound) | OXT-212 (Toa Gosei Co., Ltd.) | 15.0 |
| Photo-induced acid generator | Esacure 1187 (lamberti, propylene carbonate 75% solution) | 4.0 |
| Sensitizer (anthracene derivative) | DEA (Kawasaki Kasei Chemicals Ltd.) | 2.0 |

TABLE 28

| Curable Composition 6 (Invention) | | Content (weight %) |
|---|---|---|
| Dispersion | Pigment 11 | 30.0 |
| Exemplary compound | C | 10.0 |
| Polymerizing compound (alicyclic epoxy compound) | EP-1 | 25.5 |
| Polymerizing compound (mono-functional oxetane compound) | AOEX 68 (Daicel Chemical Industries Ltd.) | 10.0 |
| Polymerizing compound (oxetane compound) | OXT-121 (Toa Gosei Co., Ltd.) | 10.0 |
| Polymerizing compound (mono-functional oxetane compound) | OXT-213 (Toa Gosei Co., Ltd.) | 10.0 |
| Photo-induced acid generator | DTS-102 (Midori Kagaku Co., Ltd.) | 3.0 |
| Sensitizer (anthracene derivative) | DEA (Kawasaki Kasei Chemicals Ltd.) | 1.5 |

TABLE 29

| Curable Composition 7 (Invention) | | Content (weight %) |
|---|---|---|
| Dispersion | Pigment 11 | 30.0 |
| Exemplary compound | D | 10.0 |
| Polymerizing compound (alicyclic epoxy compound) | Celloxide 3000 (Daicel Chemical Industries Ltd.) | 20.5 |
| Polymerizing compound (mono-functional epoxy compound) | AOEX 24 (Daicel Chemical Industries Ltd. | 10.0 |
| Polymerizing compound (oxetane compound) | OXT-121 (Toa Gosei Co., Ltd.) | 15.0 |
| olymerizing compound (mono-functional oxetane compound) | OXT-211 (Toa Gosei Co., Ltd.) | 10.0 |
| Photo-induced acid generator | CI 15102 (Nippon Soda Co., Ltd.) | 3.0 |
| Sensitizer (thioxanthone derivative) | DETX (Nippon Kayaku Co., Ltd.) | 1.5 |

TABLE 30

| Curable Composition 8 (Invention) | | Content (weight %) |
|---|---|---|
| Exemplary compound | Pigment 12 | 30.0 |
| Exemplary compound | H | 10.0 |
| Polymerizing compound | Stearyl acrylate (mono-functional) | 20.0 |
| Polymerizing compound | Polyethyleneglycol diacrylate (bi-functional) | 20.0 |
| Polymerizing compound | Trimethylolpropane triethyleneoxide modified triacrylate (tri-functional) | 16.0 |
| Photo-induced acid generator | Irgacure 1800 (manufactured by Ciba Specialty Chemicals Corp.) | 2.0 |
| Photo-induced acid generator | Irgacure 500 (manufactured by Ciba Specialty Chemicals Corp.) | 2.0 |

TABLE 31

| Curable Composition 9 (Invention) | | Content (weight % |
|---|---|---|
| Dispersion | Pigment 11 | 30.0 |
| Exemplary compound | B | 10.0 |
| Polymerizing compound (alicyclic epoxy compound) | Celloxide 2021P (Daicel Chemical Industries Ltd.) | 18.5 |
| Polymerizing compound (mono-functional epoxy compound | AOEX 68 (Daicel Chemical Industries Ltd.) | 10.0 |
| Polymerizing compound (vinyl ether compound) | CHVE (ISP Japan Ltd.) | 15.0 |
| Polymerizing compound (vinyl ether compound) | DVE-3 (ISP Japan Ltd.) | 10.0 |
| Photo-induced acid generator | UVI 6992 (Dow Chemical, propylene carbonate 50% solution) | 5.0 |
| Sensitizer (anthracene derivative) | DEA (Kawasaki Kasei Chemicals Ltd.) | 1.5 |

The prepared actinic radiation curable composition, after having been coated by use of a wire bar so as to make a layer thickness of 6 μm on PET film having a thickness of 80 μm, was exposed by use of light source VZero 085 produced by Integration Technology Corp. with A bulb at an output power of 80 W/cm under a high humidity condition of 27° C. and 80% RH. The coated film was passed 2 cm under the light source at a speed of 500 mm/s to obtain a cured sample. With respect to obtained samples, evaluations of the following 1 and 2 were performed.

Further, the above operation was repeated 10 times to prepare a cured sample having a thickness of 60 μm, which was evaluated according to following method 3.

<Evaluation Method of Cured Film>

1) Hardness of each cured product was measured according to Pencil Scratch Test (JIS K 5400).

The rank of hardness is in the order of (soft) 6B-B, HB, F, H-9H (hard); 6B is the softest, 9H is the hardest, and the harder, the preferable.

2) Grid Tape Peel-off Residual Adhesion Ratio Test: Adhesive tape (Scotch #250 manufactured by Sumitomo 3M), after having been pasted on cured composition samples prepared in the grid test of JIS K 5400 to be pressed back and forth by a roller of 2 kg, was peeled off at a dash, and the number of remaining grid form samples was examined. The larger is the residual ratio, the preferable.

3) Flexibility Test of Cured Film

It was evaluated based on the degree of bending crack when a sample was wound around a stainless rod having a diameter of 3 mm.

Evaluation was made based on the following criteria.

A: No cracking generated at all by bending (winding round).

B: Some cracking generation was observed when being bended (wound round) plural times.

C: Cracking was generated when being bended (wound round).

Each evaluation result described above will be shown in table 32.

TABLE 32

| Cured product composition | Pencil scratch hardness | Adhesion residual ratio | Flexibility |
|---|---|---|---|
| 1 | 2H | 20% | C |
| 2 | B | 50% | C |
| 3 | H | 70% | A |
| 4 | 3H | 70% | A |
| 5 | H | 70% | A |
| 6 | 4H | 70% | A |
| 7 | 4H | 70% | A |
| 8 | H | 65% | B |
| 9 | 3H | 74% | A |

It is clear from the results described in table 32 that cured film of an actinic radiation curable composition according to this invention is superior, compared to comparative samples, in hardness of cured film, peel-off resistance (peel-off residual ratio) and flexibility, regardless of aging temperature and period.

<Evaluation of Ink-Jet Ink after Storage>

The following ink compositions 3, 3b, 3c were stored in a sealed ink tank at a temperature of 70° C. for 10 days. Ink compositions 3b and 3c were each respectively prepared in the same manner as preparing Ink composition 3 (see Table 3) except that Exemplary compound B was substituted with the same amount of Exemplary compounds B' for making 3b and B" for making 3c. Exemplary compounds B, B' and B" each respectively contains isocyanate groups in an amount of 0.01%, 0.1% and 0.2%.

The viscosities of the ink compositions before and after storage were measured. The increased viscosity value after storage with respect to before storage was determined and evaluation was done according to the criteria indicated below.

A: Increase of viscosity is less than 0.5 (mPa·s).

B: Increase of viscosity is from 0.5 to less than 1.0(mPa·s).

C: Increase of viscosity is from 1.0 (mPa·s) or more.

The ranks A and B can be used for making an image. The rank C cannot be applicable for making an image due to ejection defect cause by the large amount of increase in viscosity.

The viscosities (mPa·s) of the ink were measured with a dynamic viscoelasticity measuring apparatus, Molecular Compact Rheometer MCR 320 (made by Physica Co. Ltd.)

The viscoelasticity measuring apparatus used for measurement was calibrated with a calibration standard solution for viscometer based on JIS Z 8809. The obtained long-term storage stability results are shown in Table 33.

As can be seen from the results shown in Table 33, the long-term storage stability cannot be acceptable when the content of isocyanate groups are larger than 0.1%.

TABLE 33

| Ink composition | Content of Isocyanate groups (%) in polyurethane | Long-term storage stability | Remarks |
|---|---|---|---|
| 3 | 0.01 | A | Inv. |
| 3b | 0.1 | B | Inv. |
| 3c | 0.2 | C | Comp. |

What is claimed is:

1. An actinic radiation curable ink comprising:
   a photopolymerizable compound; and
   a urethane polymer,
   wherein the urethane polymer has no photopolymerizable groups in the molecule,
   a content of isocyanate groups remaining in the urethane polymer is 0.1% or less based on the total number of the isocyanate groups required to prepare the urethane polymer in the actinic radiation curable ink,
   and the urethane polymer represents 1 to 20 weight % based on the weight of the actinic radiation curable ink.

2. The actinic radiation curable ink of claim 1,
   wherein the urethane polymer has a weight-average molecular weight of 600 to 10,000.

3. The actinic radiation curable ink of claim 1, wherein the photopolymerizable compound comprises a mono-functional monomer in an amount of 10 to 30 weight% based on the total weight of the photopolymerizable compound.

4. The actinic radiation curable ink of claim 1,
   wherein the photopolymerizable compound comprises a mono-functional epoxy monomer or a bi-functional epoxy monomer.

5. The actinic radiation curable ink of claim 1,
   wherein the photopolymerizable compound comprises a mono-functional oxetane monomer or a bi-functional oxetane monomer.

6. The actinic radiation curable ink of claim 1, further comprising a pigment as a colorant.

7. A method of forming an image comprising the steps of:
   ejecting droplets of the actinic radiation curable ink of claim 6 from an ink-jet recording head so as to deposit on a recording material; and
   irradiating the deposited droplets of the ink on the recording material with actinic radiations,
   wherein the recording material is made of a fiber material.

8. A method of forming an image comprising the steps of:
   ejecting droplets of the actinic radiation curable ink of claim 6 from an ink-jet recording head so as to deposit on a recording material; and
   irradiating the deposited droplets of the ink on the recording material with actinic radiations, wherein both the actinic radiation curable ink and the ink-jet recording head have been heated in the range of 35 to 100 ° C. prior to ejecting the actinic radiation curable ink from the ink-jet recording head.

9. The actinic radiation curable ink of claim 1, wherein the urethane polymer represents 5 to 15 weight % based on the weight of the actinic radiation curable ink.

10. The actinic radiation curable ink of claim 1, wherein the urethane polymer has a weight-average molecular weight of 1,000 to 4,000.

11. The actinic radiation curable ink of claim 1, wherein the photopolymerizable compound has a molecular weight of less than 1,000.

12. The actinic radiation curable ink of claim 1, wherein the photopolymerizable compound is selected from the group consisting of a diglycidyl ether of ethylene glycol, a diglycidyl ether of propylene glycol, a diglycidyl ether of 1,6-hexanediol; a di- or tri-glycidyl ether of glycerin, or an alkylene oxide adduct thereof, a diglycidyl ether of polyethylene glycol or an alkylene oxide adduct thereof, and a diglycidyl ether of polypropylene glycol or an alkylene oxide adduct thereof.

13. The actinic radiation curable ink of claim 1, wherein the photopolymerizable compound is selected from the group consisting of 1,4-butanediol diacrylate, 1,6-hexanediol diacrylate, 1,9-nonanediol diacrylate, neopentylglycol diacrylate, dimethyloltricyclodecane diacrylate, ethylene oxide adduct of bisphenol diacrylate, propene oxide adduct of bisphenol diacrylate, hydroxypivalic acid neopentylglycol diacrylate, polytetramethyleneglycol diacrylate, trimethylolpropane triacrylate, ethylene oxide modified trimethylolpropane triacrylate, pentaerythritol triacrylate, pentaerythritol tetraacrylate, dipentaerythritol hexaacrylate, ditrimethylolpropane tetraacrylate, glycerinpropoxy triacrylate, caprolactone modified trimethylolpropane triacrylate, pentaerythritolethoxy tetraacrylate and caprolactone modified dipentaerythritol hexaacrylate.

14. The actinic radiation curable ink of claim 1,
wherein a viscosity of the ink composition is in the range of from 28 to 43 mPa·s at a temperature at 25° C.

15. An inkjet ink comprising the actinic radiation curable ink of claim 1.

16. The actinic radiation curable ink of claim 6,
wherein the pigment is selected from the group consisting of C. I. Pigment Yellow-1, 2, 3, 12, 13, 14, 16, 17, 73, 74, 75, 81, 83, 87, 93, 95, 97, 98, 109, 114, 120, 128, 129, 138, 150, 151, 154, 180, 185, C.I. Pigment Red-5, 7, 12, 22, 38, 48:1, 48:2, 48:4, 49:1, 53:1, 57:1, 63:1, 101, 112, 122, 123, 144, 146, 168, 184, 185, 202, C.I. Pigment Violet-19, 23, C.I. Pigment Blue-1, 2, 3, 15:1, 15:2, 15:3, 15:4, 18, 22, 27, 29, 60, C.I. Pigment Green-7, 36 and C.I. Pigment Black 7.

* * * * *